US008170990B2

(12) United States Patent
Shitomi

(10) Patent No.: US 8,170,990 B2
(45) Date of Patent: May 1, 2012

(54) INTEGRATED REMOTE REPLICATION IN HIERARCHICAL STORAGE SYSTEMS

(75) Inventor: Hidehisa Shitomi, Mountain View, CA (US)

(73) Assignee: Hitachi, Ltd., Tokyo (JP)

( * ) Notice: Subject to any disclaimer, the term of this patent is extended or adjusted under 35 U.S.C. 154(b) by 929 days.

(21) Appl. No.: 12/155,149

(22) Filed: May 30, 2008

(65) Prior Publication Data

US 2009/0300079 A1    Dec. 3, 2009

(51) Int. Cl.
*G06F 7/00*  (2006.01)
*G06F 17/00*  (2006.01)
(52) U.S. Cl. ............... 707/640; 707/610; 707/661
(58) Field of Classification Search ............ 707/201, 707/202, 204, 610, 634, 640, 661
See application file for complete search history.

(56) References Cited

U.S. PATENT DOCUMENTS

| 2007/0130232 | A1* | 6/2007 | Therrien et al. | ........... 707/204 |
| 2007/0192551 | A1 | 8/2007 | Hara et al. | |
| 2007/0198602 | A1* | 8/2007 | Ngo et al. | ........... 707/201 |
| 2007/0239803 | A1 | 10/2007 | Mimatsu | |
| 2007/0266059 | A1 | 11/2007 | Kitmura | |
| 2008/0010325 | A1* | 1/2008 | Yamakawa | ........... 707/204 |

OTHER PUBLICATIONS

"EMC Centera Content-Addressed Storage System", Data Sheet, EMC Corp, 2007.
DuBois, L., "White Paper-Active Archiving: Hitachi Content Archive Platform", IDC Corp., Jun. 2006, pp. 1-20.

* cited by examiner

*Primary Examiner* — Etienne Leroux
*Assistant Examiner* — Chelcie Daye
(74) *Attorney, Agent, or Firm* — Mattingly & Malur, P.C.

(57) ABSTRACT

Remote replication is implemented with hierarchical storage. In exemplary embodiments, a first storage site has a first storage system providing an upper tier of storage and a second storage system providing a lower tier of storage. A remote second storage site has third and fourth storage systems configured to receive remote replication from the first and second storage systems, respectively. When a file is migrated from the upper tier to the lower tier, a stub file is stored in place of the migrated file indicating a storage location of the migrated file on the second storage system. When copies of the migrated file and the stub file are replicated to the fourth and third storage systems, respectively, information is transmitted to the second storage site for linking the copy of the stub file at the third storage system to the copy of the migrated file at the fourth storage system.

20 Claims, 20 Drawing Sheets

1125

| Tier1 Name | Tier1 Type | Tier2 Name | Tier2 Type |
|---|---|---|---|
| NAS1 (192.168.1.1) | NAS | CAS1 (192.168.1.2) | CAS |
| NAS10 (192.168.1.10) | NAS | NAS11 (192.168.1.11) | NAS |

2511, 2512, 2513, 2514

Primary Site Tier Management Table

| Tier1 Name | Tier1 Type | Tier2 Name | Tier2 Type |
|---|---|---|---|
| NAS3 (10.1.1.3) | NAS | CAS2 (10.1.1.2) | CAS |
| NAS12 (10.1.1.12) | NAS | NAS13 (10.1.1.13) | NAS |

2511, 2512, 2513, 2514

Secondary Site Tier Management Table

| 2521 | 2522 | 2523 |
|---|---|---|
| File Name (in Tier1) | Condition | Target Location |
| /nas1/a.txt | No access > 90 days | /cas1/a.txt |
| /nas1/b.txt | File size > 1GB | /cas1/b.txt |
| /nas1/c.txt | Include word "confidential" & No write > 30 days | /nas2/c.txt |

Primary Site File Location Management Table

| 2521 | 2522 | 2523 |
|---|---|---|
| File Name (in Tier1) | Condition | Target Location |
| /nas3/a.txt | No access 90 days | /cas2/a.txt |
| /nas3/b.txt | File size > 1GB | /cas2/b.txt |
| /nas3/c.txt | Include word "confidential" & File size > 100MB | /nas4/c.txt |

Secondary Site File Location Management Table

| | Primary Site | Primary Site Source File or File System | Secondary Site | Secondary Site File or File System |
|---|---|---|---|---|
| 2537 | NAS1 | /nas1/a.txt | NAS3 | /nas3/a.txt |
| 2538 | CAS1 | /cas1.a.txt | CAS2 | /cas2/a.txt |
| | NAS2 | /nas2 | NAS4 | /nas4 |

2531, 2532, 2533, 2534

Remote Replication Management Table

| File Name | Inode | | | Target Location |
|---|---|---|---|---|
| | owner | File size | ... | |
| /nas1/a.txt | aaa | 100MB | ... | /cas2/a.txt |
| /nas10/b.txt | bbb | 1GB | ... | /nas11/b.txt |

2541, 2544, 2542, 2545, 2543

Stub Management Table

FIG. 6

Stub Generation

Stub Generation

Processing of READ Commands

Processing of WRITE Commands

Migration Back

Migration Back

Remote Replication in HSM System
(Prior Art)

First Embodiments of Remote Replication in a HSM System

First Embodiments of Remote Replication in a HSM System

Second Embodiments of Remote Replication in a HSM System

Second Embodiments of Remote Replication in a HSM System

Third Embodiments of Remote Replication in a HSM System

Third Embodiments of Remote Replication in a HSM System

Fourth Embodiments of Remote Replication in a HSM System

INTEGRATED REMOTE REPLICATION IN HIERARCHICAL STORAGE SYSTEMS

BACKGROUND OF THE INVENTION

According to recent trends, hierarchical storage systems (also referred to as tiered storage systems) are being used to optimize storage resources and reduce the cost of data storage. Hierarchical or tiered storage is a solution for reducing the cost of storing data by differentiating various types of data, and then storing the data in storage devices that are selected to provide an appropriate level of reliability and performance. For example, a hierarchical storage system may include plural storage tiers such as a high reliability, high performance, and premium cost first tier that may be used for important data that is accessed often, and a lower reliability, lower performance, and less expensive second tier that may be used for archive data or other infrequently-accessed data. Data can be stored according to a classified type, particular owner, level of service agreement, or the like, and also may be migrated between tiers based on various situations and contingencies. In some applications, three or more tiers of storage may be provided for even greater efficiency of storage resource use. Thus, by using these various levels of tiered storage resources, the total cost of storage can be reduced, while required access speed or reliability for specific data can still be maintained.

The storage hierarchy in a tiered storage system can be made up of Network Attached Storage (NAS) and/or Contents Addressable Storage (CAS). A NAS is typically a file-based storage system accessible over a network via a file-based protocol, such as NFS (Network File System) protocol or CIFS (Common Internet File System) protocol, and may include a NAS head that manages input/output (I/O) operations received from users, and a storage portion including storage mediums that store the actual data. A CAS is special purpose storage that may be used for online archiving, and which may use an address in the storage system based upon the content of the data being stored. Regulatory compliance requirements have resulted in the usage of CAS for archiving, and the like. For example, files or objects in a CAS system typically may be stored without any update for some specified period of time referred to as a "retention period". There are two conventional file access methods for CAS, one of which uses general network file system protocols such as NFS protocol or CIFS protocol. The other conventional file access method for CAS involves using a content ID as a storage address calculated according to the file name of a file or the content of the file. The present invention is not limited to a particular access method.

Storage hierarchies (also referred storage tiers) are typically created for several reasons such as optimizing storage cost or because of a functional difference between tiers, such as performance and/or reliability. For example, data which is expected to be infrequently accessed can be stored in a lower cost and lower performance storage tier. In such a situation, a first tier of storage (e.g., "tier 1") may be a high performance NAS (typically having a lower capacity), and a second tier of storage (e.g., "tier2") may be a standard performance NAS (typically having a larger capacity). Additionally, data which does not have to be accessed fast, but is needed to be stored as a write once feature for the compliance reasons some days after its generation should be moved into an archive storage such as a CAS (e.g., a second tier), even if the data was generated on a NAS (e.g., a first tier).

HSM (Hierarchical Storage Management) is software implemented to manage storage tiers and move or migrate data between tiers. Some implementations of HSM realize client-transparent data migration using what are known as stub files or "stubs". A stub is a data file that stands in for the original file, and is similar to a shortcut in the Windows® operating system or a symbolic link in the Unix® operating system. In some implementations, HSM software constantly monitors storage medium capacity and moves data from one storage level to the next based on age, category and other criteria as specified by the network or system administrator. HSM often includes a system for routine backup as well. For example, when a file is migrated from a first storage tier to a second storage tier, the migrated file is replaced with a small stub file that indicates where the migrated file was moved to. Thus, after moving the migrated file from an upper tier to a lower tier, for example, a small stub file is placed at the same location (i.e., same path name or address) that was previously occupied by the migrated file. Embodiments of the present invention are related to the HSM system implementing the stub file mechanism.

Another technology that is widely used is remote replication of data from one storage system to another storage system. Remote replication is often used to enable recovery of data following a disaster, or the like. It would be desirable to use remote replication with a HSM system to make disaster recovery possible. However, when current remote replication technology is combined with HSM technology, numerous problems can arise which prevent proper operation, such as link information corruption, tier configuration corruption, or the like.

Related art includes US Pat. Appl. Pub. No. 2007/0239803 to Mimatsu, US Pat. Appl. Pub. No. 2007/0266059 to Kitamura, and US Pat. Appl. Pub. No. 2007/0192551 to Hara et al., the entire disclosures of which are incorporated herein by reference.

BRIEF SUMMARY OF THE INVENTION

Exemplary embodiments of the invention provide a method, apparatus and computer programs to enable remote replication in a HSM system. Exemplary embodiments of the invention maintain correct link information and provide means to re-establish target location information according to tier configurations at remote sites. Additionally, exemplary embodiments of the invention maintain tier configuration and provide means to create a stub at the first storage tier and/or move files from the first storage tier to the second storage tier. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIGS. 3A-3B illustrate exemplary data structures of tier management tables.

FIGS. 4A-4B illustrate exemplary data structures of file location management table.

FIG. 5 illustrates an exemplary data structure of a remote replication management table.

FIG. 6 illustrates an exemplary data structure of a stub management table.

DETAILED DESCRIPTION OF THE INVENTION

Figure 1:
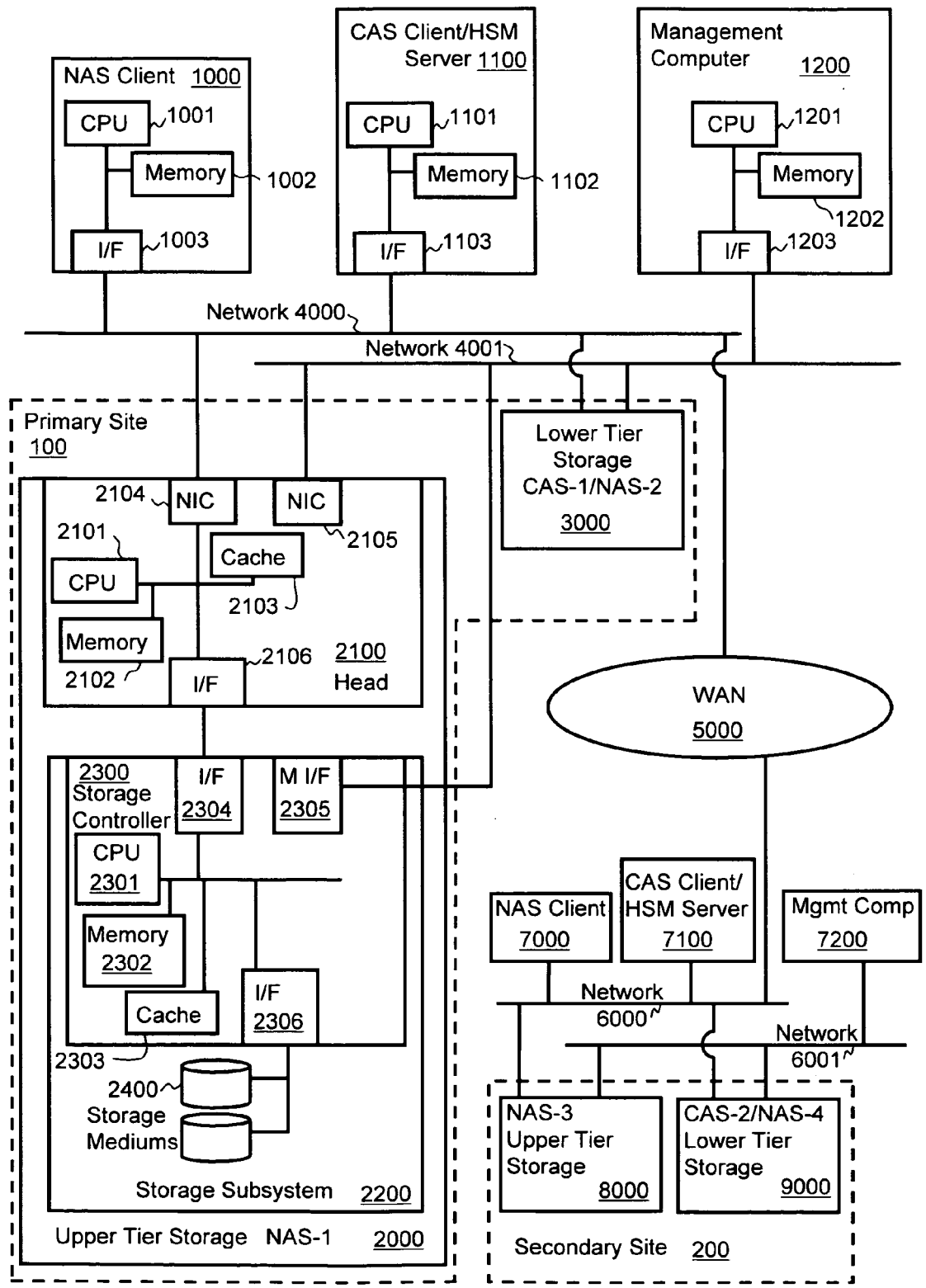
FIG. 1 illustrates an example of a hardware configuration in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment" or "this embodiment" means that a particular feature, structure, or characteristic described in connection with the embodiment is included in at least one embodiment of the invention, and the appearances of these phrases in various places in the specification are not necessarily all referring to the same embodiment. Additionally, the drawings, the foregoing discussion, and following description are exemplary and explanatory only, and are not intended to limit the scope of the invention in any manner. For example, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations on data bits within a computer. These algorithmic descriptions and representations are the means used by those skilled in the data processing arts to most effectively convey the substance of their work to others skilled in the art. An algorithm is here, and generally, understood to be a series of defined steps leading to a desired end state or result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the action and processes of a computer system or other information processing device that manipulates and transforms data represented as physical (electronic) quantities within the computer system registers and memories into other data similarly represented as physical quantities within the computer system memories or registers or other such information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer readable storage medium, such as, but not limited to optical disks, magnetic disks, read-only memories, random access memories, solid state devices and drives, or any other type of media suitable for storing electronic information. The algorithms and displays presented herein are not inherently related to any particular computer or other apparatus. Various general-purpose systems may be used with programs in accordance with the teachings herein, or it may prove convenient to construct a more specialized apparatus to perform desired method steps. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

First Embodiments

Exemplary embodiments of the invention, as will be described in greater detail below, provide apparatuses, methods and computer programs for remote replication in a HSM system. FIG. 1 illustrates an example of a hardware configuration of an information system in which first embodiments of the invention may be applied. The information system of FIG. 1 includes one or more NAS Client Computers 1000 in communication via a first network 4000 with one or more CAS Client/HSM Server Computers 1100, a Management Computer 1200, an upper tier storage 2000 (NAS-1), and a lower tier storage 3000 (CAS-1 or NAS-2). The CAS Clients and HSM Servers are depicted in FIG. 1 as being implemented on the same physical computer 1100. However, in alternative embodiments, these can be implemented on two or more separate computers. Moreover, the Management Computer 1200 is depicted as a separate computer. However, in other embodiments, the Management Computer 1200 can be the same computer as CAS Client/HSM Server Computer 1100.

Upper tier storage system 2000 generally provides a level of storage having first storage characteristics, such as high performance or particular types of storage or access properties, while lower tier storage system 3000 generally provides a different level storage having second storage characteristics different from the first, such as lower performance, less expensive storage mediums, or different storage or access properties. For example, in some embodiments, lower tier storage system 3000 may be a CAS (CAS-1), while in other embodiments, lower tier storage system 3000 may be a second NAS (NAS-2) instead of a CAS, depending on the desired configuration and intended use of the information system. Thus, when lower tier storage 3000 is a NAS, the upper tier storage system 2000 is typically a high-performance NAS (NAS-1) used as the higher tier of storage in a hierarchical storage arrangement, while the lower tier storage 3000 would typically be a lower performance and less expensive NAS (NAS-2) used as a lower tier of storage. Together, upper tier storage system 2000 and lower tier storage system 3000 make up a primary storage site 100.

Further, a remote secondary storage site 200 is provided for Disaster Recovery or other remote copy purposes, and may have a system configuration system similar to that of primary site 100. In the illustrated embodiment, an upper tier storage system 8000 at secondary site 200 is a NAS (NAS-3) and a lower tier storage system 9000 at secondary site 200 is a CAS (CAS-2) or second NAS (NAS-4). NAS Client computers 7000 may use the secondary site 200, and secondary site 200 may also include a CAS Client/HSM Server computer 7100 and a Management Computer 7200. Secondary site 200 includes network 6000 and management network 6001 which may be physically the same network or separate networks. Network 6000 is in communication with network 4000 at the primary site via a WAN (Wide Area Network), which may be the Internet or other WAN type. Further, in some embodiments, at secondary site 200 the lower tier storage 9000 might not exist. For example, a user who actively uses only NAS 8000 at the secondary site might prefer to save money by not buying the second tier storage 9000. In such a case, the second tier storage 9000 would just used for backup of the disaster recovery data of upper tier storage 8000, and thus, it might not be necessary to purchase an additional lower tier storage 9000 in this situation. However, a user who needs compliance-proof storage such as a CAS for storing data will need to deploy a CAS in the secondary site as lower tier storage 9000.

Details of the various components of the information system will now be described. Each NAS Client 1000 may be a general purpose computer, workstation, including a CPU 1001, a memory and storage 1002, and a network interface (I/F) 1003. Application programs and a Network File System (i.e., NFSv2/3/4, CIFS) client program (described in FIG. 2) are stored in memory 1002 and executed by CPU 1001. Network Interface (I/F) 1003 is connected for communication with upper tier storage system 2000 via Network 4000. Network 4000 can be physically the same network as a management network 4001 used by management computer 1200 or may be a separate network. However, network 4000 is preferably at least logically separated from network 4001, and further, network 4000 may be logically divided into several logical networks such as a NAS network including NAS Clients 1000, CAS Client/HSM Server 1100, and upper tier storage 2000 (NAS-1); a CAS network including CAS Client/HSM Server 1100, upper tier storage 2000, and lower tier storage 3000 (CAS-1); and a remote access network including remote upper tier storage 8000 (NAS-3), remote lower tier storage 9000 (CAS-2), CAS Client/HSM Server 7100 and WAN 5000. A typical media of the networks 4000, 4001 is Ethernet®, but the invention is not limited to any particular type of network media.

The CAS Client and HSM server can be on the same physical computer 1100, which may also be a general purpose computer, workstation, or the like, and which may include a CPU 1101, a memory and storage 1102, and a network interface (I/F) 1103. Each CAS Client may include an archive application program and Network File System client program or proprietary communication program (for communicating with CAS 3000) (described in FIG. 2). HSM Server may include HSM application programs such as a Tier Management program, a Migration Engine and a Network File System client program or proprietary communication program (for communicating with CAS 3000) (described in FIG. 2). Network Interface 1103 is connected for communication with NAS 2000 and CAS 3000 via network 4000.

Management Computer 1200 may also be a general purpose computer, workstation, or the like, and may include a CPU 1201, a memory and storage 1202, and a network interface (I/F) 1203. NAS and CAS Management programs (described in FIG. 2) are stored in memory 1202 and executed by CPU 1200. Network interface 1203 is connected to NAS 2000 and CAS 3000 via Management Network 4001. As discussed above, Network 4000 and Management Network 4001 can be either physically separate networks or logically separate networks, such as through utilization of network partitioning technology such as VLAN.

Upper tier storage system 2000 (NAS-1) includes two main parts a NAS Head 2100 and a storage subsystem 2200. The storage subsystem 2200 includes a storage controller 2300 and storage mediums 2400, which may be hard disk drives, solid state drives, or other suitable storage devices. Head 2100 and storage subsystem 2200 can be connected via interfaces 2106 and 2304. Head 2100 and storage subsystem 2200 can exist in one storage unit, also referred to as a "filer". In this case, head 2100 and storage subsystem 2200 are connected via a system bus such as PCI-X. Moreover, the head 2100 can include internal disk drives without connecting to any storage controller, which is quite similar to a general purpose server. On the other hand, the head 2100 and controller 2300 can be physically separate units. In this case, head 2100 and storage subsystem 2200 are connected via network connections such as Fibre Channel, Ethernet®, or the like. Thus, although numerous hardware implementations are possible, any of these implementations can be applied to the invention. Further, while FIG. 1 illustrates a system configuration having a single node, system configurations including multiple node clusters can be applicable to the present invention, and the cluster configuration does not affect the invention.

Head 2100 (also sometimes referred to as a "Gateway") comprises a CPU 2101, a memory 2102, a cache 2103, a frontend network interface (NIC) 2104, a management network interface (NIC) 2105, and a disk interface (I/F) 2106. The NICs 2104 and 2105 can be physically separate and/or logically separate. Head 2100 processes requests from NAS clients 1000, CAS Client/HSM Server 1100, and Management Computer 1200. Further, NAS programs such as a Network File System server program are stored in memory 2102 (see FIG. 2), and CPU 2101 executes the programs. Cache 2103 stores NFS write data from NAS clients 1000 temporarily before the data is forwarded into the storage subsystem 2200, or cache 2103 stores NFS read data that is requested by the NAS clients 1000 as it is read from storage subsystem 2200 to be sent to a requesting client. Cache 2103 may be a battery backed-up non-volatile memory. In another implementation, memory 2102 and cache memory 2103 are a common combined memory. Frontend network interface 2104 is used to connect head 2100 for communication with NAS client 1000, CAS client/HSM Server 1100 via network 4000. Management network interface 2105 is used to connect head 2100 for communication with management computer 1200 via management network 4100. Disk interface 2106 is used to connect between head 2100 and storage subsystem 2200. Fibre Channel (FC) and Ethernet® are typical examples of the connection type. In the case of an internal connection between head and controller (i.e. single storage unit implementation), a system bus is a typical example of the connection.

Storage controller 2300 comprises a CPU 2301, a memory 2302, a cache memory 2303, a frontend interface 2304, a management interface (M I/F) 2305, and a disk interface (I/F) 2306. Storage controller 2300 processes I/O requests from the Head 2100. The programs to process I/0 requests or perform other operations are stored in memory 2302 (see FIG. 2), and CPU 2301 executes these programs. Cache memory 2303 temporarily stores the write data received from the head 2100 before the data is stored into storage mediums 2400, or cache 2303 stores read data that is read from storage mediums 2400 in response to a request from head 2100. Cache 2303 may be a battery backed-up non-volatile memory. In another implementation, memory 2302 and cache memory 2303 may be a common combined memory. Interface 2304 is used to connect between head 2100 and storage controller 2300. Fibre Channel (FC) and Ethernet® are typical examples of the connection. As discussed above, a system bus connection such as PCI-X can be applied in the case of a unitary filer. Management interface (M I/F) 2305 is used to connect between Management Computer 1200 and storage controller 2300. Disk interface (I/F) 2306 is used to connect disk drives 2400 and the storage controller 2300. The storage mediums 2400 may be disk drive devices or other suitable storage mediums for processing I/O requests and storing data in accordance with storage protocol commands such as SCSI (small computer system interface) commands.

The hardware configuration of the lower tier storage 3000 (CAS-1 or NAS-2) may be essentially the same as that described above for upper tier storage 2000. The difference in hardware between upper tier storage 2000 and lower tier storage 3000 typically might be that the storage mediums 2400 in the lower tier storage are of a lower performance, less expensive type. For example, in the case in which upper tier storage 2000 employs high performance FC disk drives as storage mediums 2400, lower tier storage might employ cheaper and large capacity disk drives such as SATA disk drives as storage mediums 2400. With respect the case in which lower tier storage 3000 is a CAS rather than a NAS, different programs will be operative on the CAS system than in the case in which lower tier storage is a NAS. In another typical configuration, the storage controller 2300 can be shared by a NAS head and a CAS head. For example, a single storage subsystem 2200 might serve as storage capacity for both NAS head 2100 of upper tier storage 2000 and lower tier storage 3000, and may internally include multiple types of storage mediums. Other appropriate hardware architecture can also be implemented for carrying out the invention, with it being understood that the system illustrated in FIG. 1 is just one of innumerable configurations in which the invention may be practiced.

Figure 2:
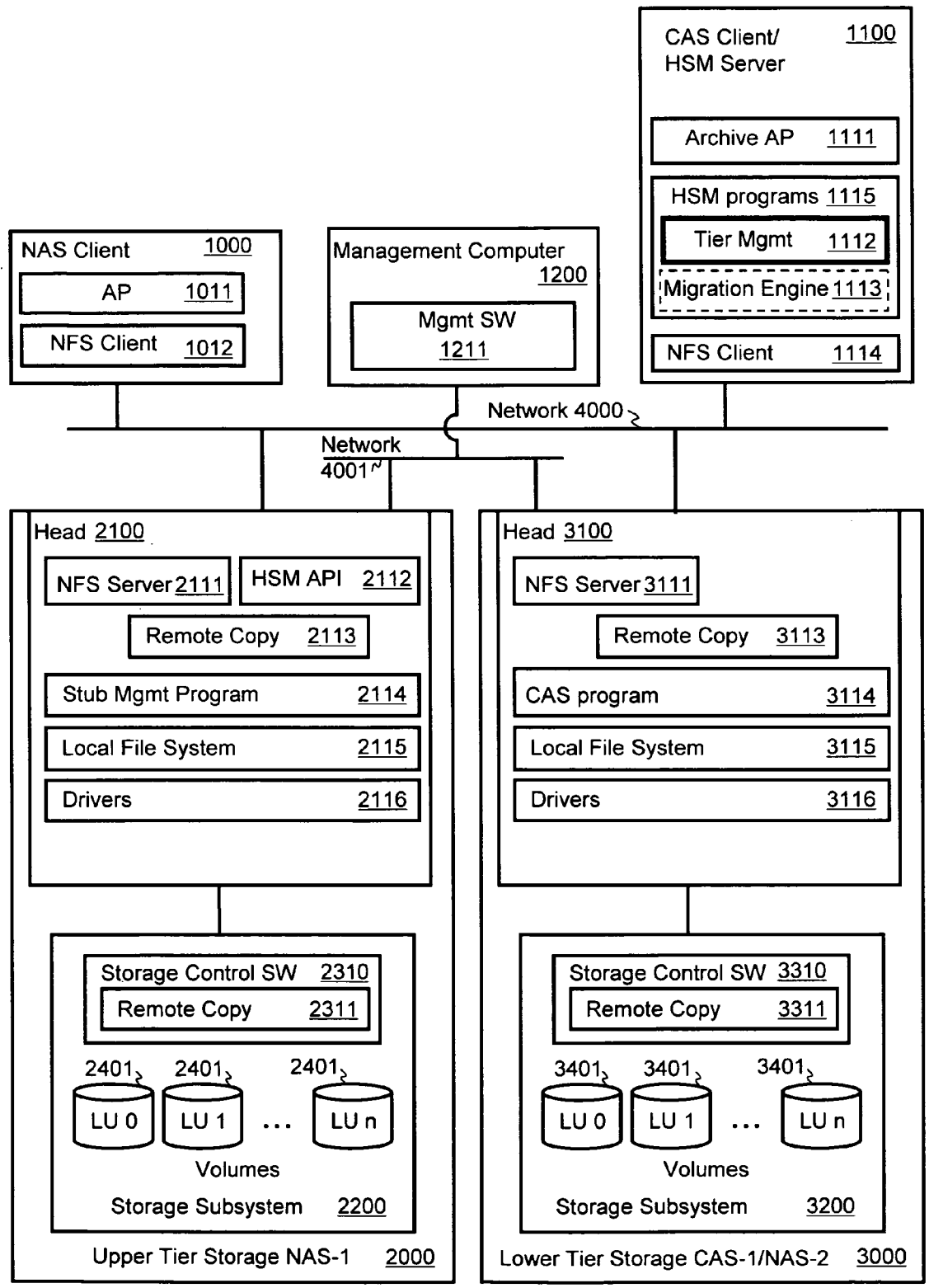
FIG. 2 illustrates an example of a logical configuration of the invention applied to the architecture of FIG. 1.

FIG. 2 illustrates an example of a software configuration in which the method and apparatus of the invention may be applied. NAS client 1000 is a computer on which some application (AP) 1011 generates file manipulating operations, such as input/output (I/O) operations. A Network File System (NFS) client program such as NFSv2, v3, v4, or CIFS 1012 is also operative on the NAS client node 1000. The NFS client program communicates with an NFS server program 2111 on NAS 2000 through network protocols such as TCP/IP. The NFS clients and NAS are connected via a network 4000 such as LAN.

With respect to Management Host Computer 1200, NAS and CAS management software 1211 resides on the Management Computer 1200. NAS/CAS management operations such as system configuration settings can be issued from the management program 1211. The remote copy configuration information such as a remote replication management table is also managed here, as discussed also in FIG. 5.

In the case in which a CAS is implemented, the CAS client computer 1100 includes an archive application (AP) 1111 that generates file archiving operations. Archive application 1111 manages archiving policies (e.g. timing of archiving) and metadata addition. The HSM Server portion includes HSM programs 1115 such as a tier management program 1112 and an optional migration engine module 1113. Tier management program 1112 manages the tier information and invokes the migration engine 1113 when necessary. Migration engine module 1113 moves a file between storage tiers when instructed to migrate a file by the tier management program 1112. The HSM programs 1115 manage the storage tier information in a Tier Management Table 1125 (see description at FIG. 3A). Furthermore, the HSM programs 1115 manage the file migration policies (e.g. timing of migration) in File Location Management Table 1126 (see description at FIG. 4A). An administrator can set the information in this table. A proprietary network communication program or general Network File System (e.g. NFSv2/3/4, CIFS) client program 1114 is also operative on the HSM Server. The NFS client program 1114 communicates with NFS server program 2111 on NAS 2000 and a proprietary communication server program or an NFS server program 3111 on lower tier storage 3000 through network protocols such as TCP/IP. The HSM programs are able to coexist with archive application 1111 without interfering with each other's operation. In an alternative embodiment, the migration engine module 1113 can be implemented in upper tier storage NAS 2000. In this case, the HSM program sends a request for file migration to NAS 2000 through an HSM API 2112 operative on NAS 2000.

Figure 7:
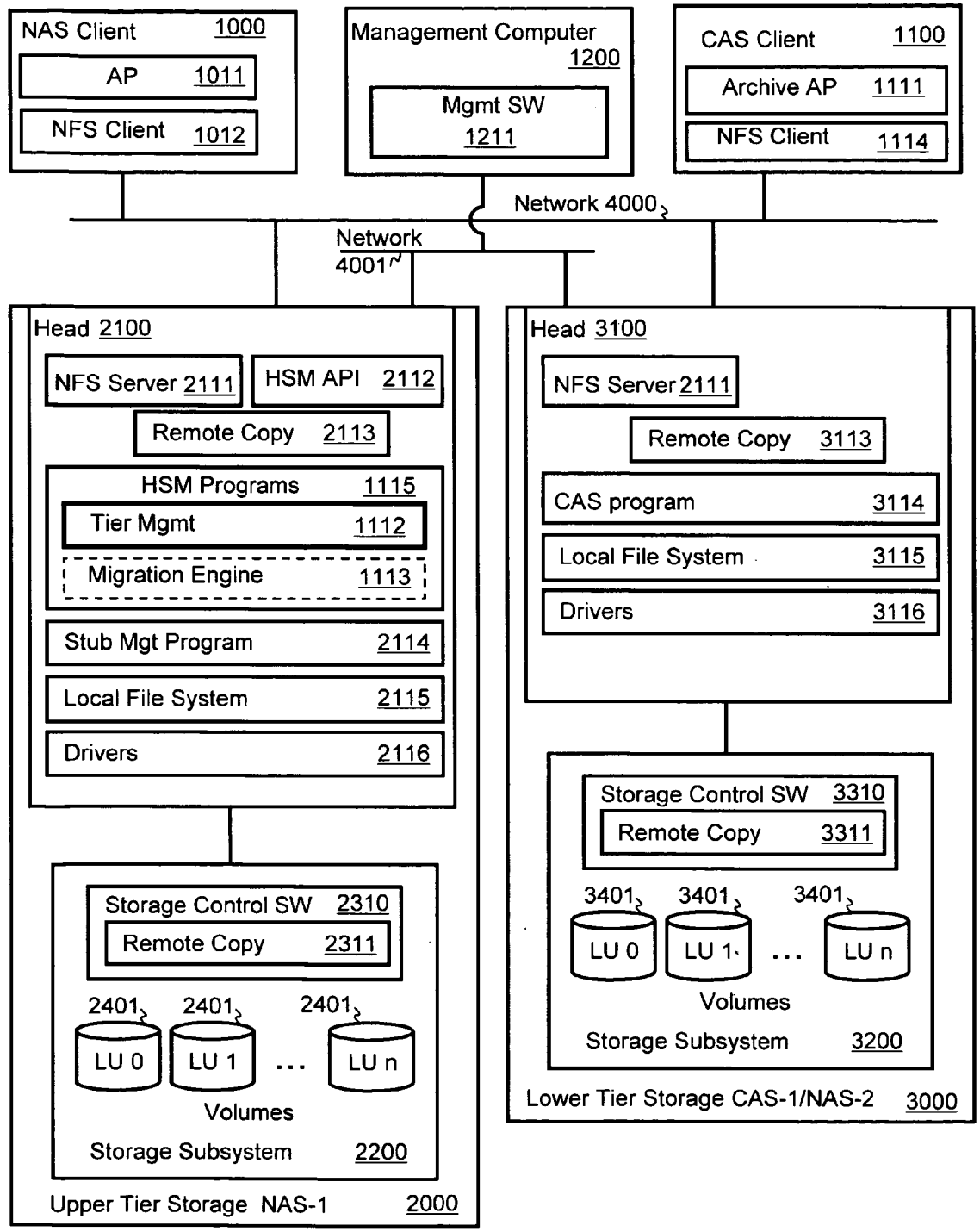
FIG. 7 illustrates an example of another logical configuration of the invention.

Moreover in yet another embodiment, as illustrated in FIG. 7, all HSM programs 1115 can reside on upper tier NAS 2000. In this embodiment, head 2100 carries out for processing of the HSM programs including the management of tiers and migration of files. Migration of files may be carried out by migration engine 2118, or by other programs on head 2100. Other possible logical configurations not illustrated will also be apparent in view of the disclosure herein.

In upper tier storage 2000, head 2100 is the part of NAS 2000 that processes operations directed to NAS 2000. Head 2100 may includes a NFS server program 2111 that communicates with NFS clients on both NAS clients 1000 and CAS client/HSM server 1100, and processes NFS operations directed to the file systems managed by NAS 2000. Further a HSM API 2112 is provided on head 2100 such that when HSM program 1115 on HSM server 1100 requests a stub generation for a migrated file and/or a migration request sent to the migration engine, the request is processed through this API. A stub management program 2114 is also provided on head 2100. To realize file migration that is transparent to the NAS client, a stub file is created which contains file properties and migration target location (stub files are managed by stub management table 1127 illustrated in FIG. 6, or stored with the information at the source file). For example, a stub file may have an Inode but instead of the Inode having a pointer to a data address, the stub file Inode points to the location (server and file location) of the migrated file. A symbolic link of UNIX is an example of one type of stub file that may be used. When a symbolic link is used, the stub management program 2114 functions as if embedded in the Local File System 2115. Otherwise (e.g. when the migration target is not mounted, and cannot be seen from the source NAS), the stub management program 2114 resides between NFS server 2111 and Local File System 2115. In this case, when an I/O operation is directed to the migrated file, the address of which is now occupied by a stub file, the program traps and processed the I/O operation. If the operation is not directed to a migrated file, the program just forwards the operation to Local File System 2115. Remote Copy program 2113 copies the WRITE operations processed at the primary storage site 100 to the secondary storage site 200. Synchronous and/or asynchronous copy schemes can be implemented. Moreover, either file-level or block-level granularity is possible for carrying out the remote copy. The local file system 2115 processes file I/O operations to the file systems on the storage subsystem 2200. Storage system drivers 2116 translate the file I/O operations into block-level operations for storing and retrieving data, and communicate with storage controller 2300 via SCSI commands, or the like.

Storage subsystem 2200 includes storage control software 2310 which processes SCSI commands received from head 2100. One or more logical volumes 2401 are created on storage subsystem 2200 and are composed of storage capacity provided by storage mediums 2400. File systems are created in a volume 2401 or on multiple volumes 2401.

Lower level storage 3000 includes a head 3100 and storage subsystem 3200. FIG. 2 illustrates the case in which lower level storage 3000 is a CAS and I/O operations directed to CAS 3000 are processed in this module. A NFS server program or proprietary communication program 3111 communicates with NFS client program or proprietary communication program on CAS client/HSM Server 1100, and processes operations to the file systems managed by CAS 3000. A remote copy program 3113 copies WRITE operations to another CAS at secondary storage site 200. Synchronous and/or asynchronous copying can be implemented for the remote copying of data. Moreover, either file level or block level granularity of remote copy is possible. A CAS program 3114 provides CAS features, such as overwrite prohibition, retention management, data integrity check, and custom metadata manipulation. The CAS program 3114 can reside between NFS Server or proprietary communication program 3111 and Local File System 3115, and trap I/O operations directed to the CAS program. The local file system 3115 processes file I/O operations to the file systems located on the storage subsystem 3200. Drivers 3116 translate the file I/O operations into the block level operations for communication with storage controller 3300 via SCSI commands, or the like.

Storage subsystem 3200 includes storage control software 3310 which processes SCSI commands received from head 3100 for storing and retrieving data. One or more logical volumes 3401 are created on storage subsystem 3200 from capacity provided by storage mediums on storage subsystem 3200. File systems are created in a volume 3401 or on multiple volumes 3401.

FIGS. 3A and 3B illustrates exemplary data structures of tier management tables 1125, 7125, with FIG. 3A illustrating a tier management table 1125 at a primary storage site 100, and FIG. 3B illustrating a tier management table 7125 at a secondary storage site 200. Tier management tables 1125, 7125 include a Tier1 name entry 2511, a Tier1 Type entry 2512, a Tier2 name entry 2513 and a Tier2 Type entry 2514. Tier management tables 1125, 7125 set forth the relationships between particular storage tier levels in the HSM system.

FIGS. 4A and 4B illustrates exemplary data structures of file location management tables 1126, 7126, with FIG. 4A illustrating a primary site file location management table 1126 at primary storage site 100, and FIG. 4B illustrating a secondary site file location management table 7126 at secondary storage site 200. File location management tables 1126, 7126 include a file name entry 2521, a condition entry 2522, and a target location 2523. File name 2521 lists the path and file name of each file managed in the respective storage system. Condition 2522 lists access conditions for accessing the corresponding file. Target location 2523 lists the target to which the corresponding file is migrated. File location management tables 1126, 7126 are used by the HSM programs 1115 to manage the file migration policies, such as when a particular file should be migrated to the target location.

FIG. 5 illustrates an exemplary data structure of a remote replication management table 1127. Remote replication management table 1127 includes a primary site entry 2531, a primary site file or file system name entry 2532, a secondary site entry 2533, and a secondary site file or file system name entry 2534. Remote replication management table 1127 is used to manage the primary and secondary locations for remote replication of the files contained in the storage system.

FIG. 6 illustrates an exemplary data structure of a stub management table 1128. Stub management table 1128 includes a file name entry 2541, an Inode entry 2542, and a target location entry 2543. Multiple additional entries may be entered under Inode 2542, including an owner entry 2544, a file size 2545, and other attributes and information contained in the Inode. Stub management table 1128 is used for determining whether to trap an I/O operation directed to a migrated file for which a stub file has been generated and to manage remote replication of stub files.

Stub Generation

Figure 8A:
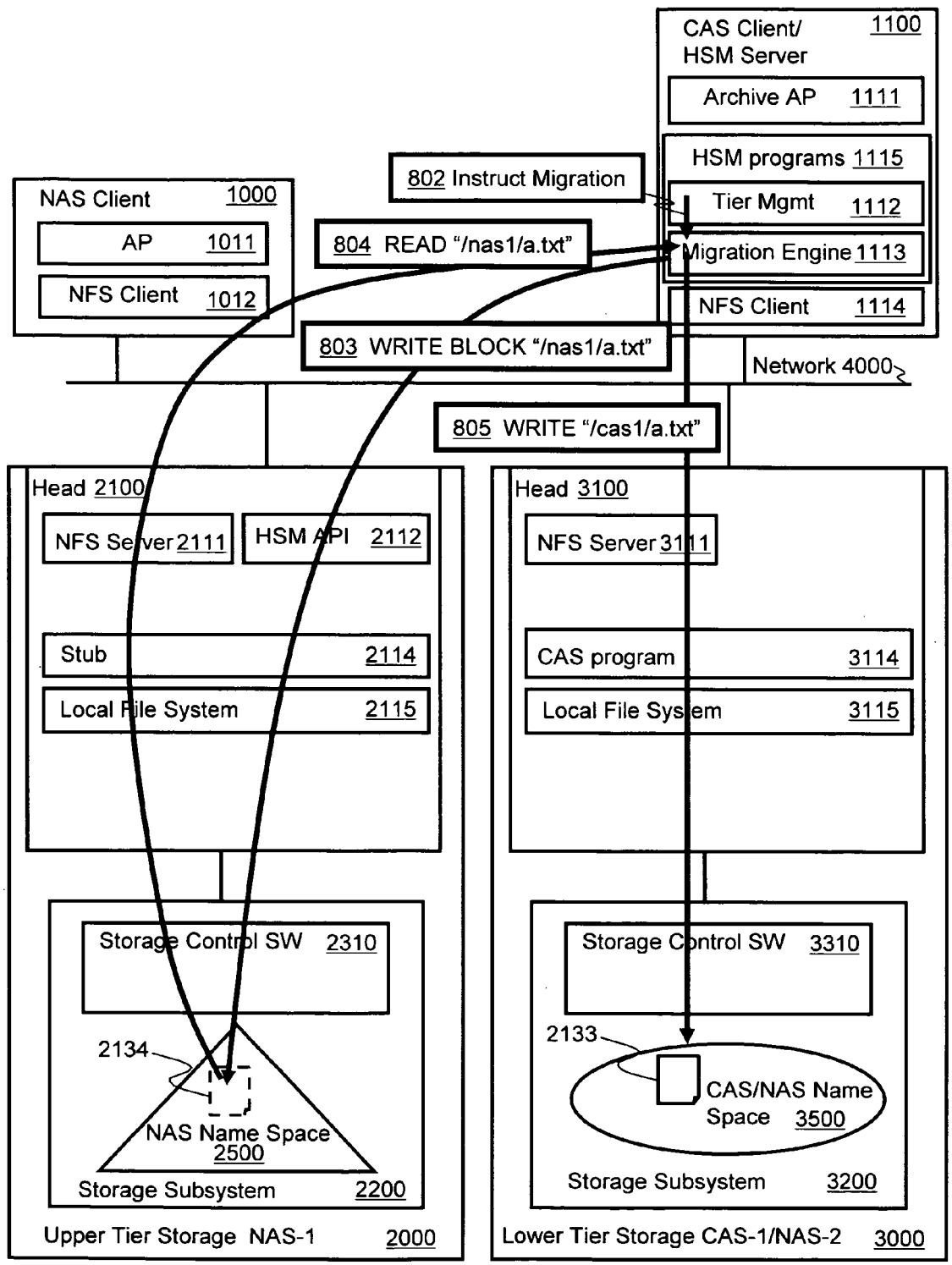
FIGS. 8A-8B illustrates exemplary processes for stub generation in the HSM system
Figure 8B:
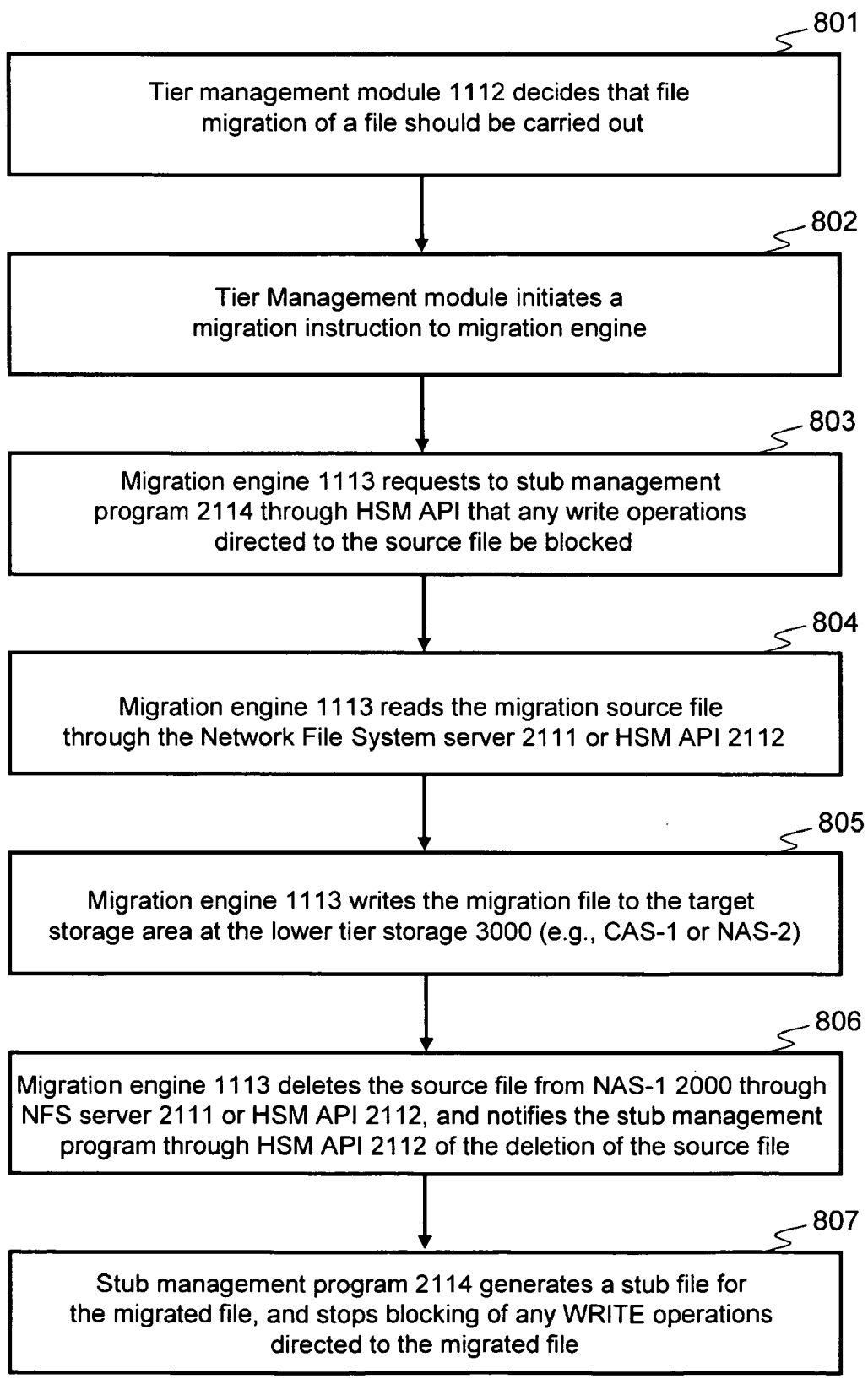

According to the stub-based HSM technology employed in the invention, a small stub file is generated after a file is migrated. The stub file contains some attribute information and location information of a corresponding migrated file. A client computer 1000 is still able to access the migrated file through the stub. Thus, the client does not have to know of the file migration, and client-transparent migration of the migrated file is realized. FIG. 8A represents a conceptual diagram of a stub generation phase, while FIG. 8B illustrates a corresponding flowchart setting forth an exemplary procedure carried out during stub generation.

Step 801: According to migration policies managed by the file location management table 1126, tier management module 1112 decides that file migration of a file (e.g. /nas1/a.txt) should be carried out. Some migration policies can be decided based on inode information such as "no access duration" and "file size". Some migration policies can be decided based on file content, for example, all files including some word or designation, such as "confidential". The tier management module 1112 checks files managed by the file location management table 1126 to determine whether the file migration conditions 2522 are met. This check can be carried out periodically or on demand such as by an administrator's request or by an instruction to move a particular group of data, received for example from archive application 1111. Moreover, if the HSM programs 1115 are implemented in NAS 2000, such as illustrated FIG. 7 the checks can be done at the time of file generation or during any other file accesses.

Step 802: Tier Management module 1112 initiates a migration instruction to migration engine 1113. The migration instruction typically includes a source file location and a migration target location. The migration target location can be set by an administrator. Alternatively, the tier management program 1112 refers to the tier management table 1125, and finds the lower tier storage for the upper tier storage, and then determines the target location on the lower tier storage, and also registers the target location in file location management table 1126.

Step 803: Migration engine 1113 requests to stub management program 2114 through HSM API that any write operations directed to the source file 2133 to be migrated be blocked. Thus, any write operations directed to the source file 2133 in NAS namespace 2500 are blocked until after migration is completed.

Step 804: Migration engine 1113 reads the migration source file 2133 through the Network File System server 2111 or HSM API 2112.

Step 805: Migration engine 1113 writes the migration file 2133 to the target storage area namespace 3500 at the lower tier storage 3000 (e.g., CAS-1 or NAS-2).

Step 806: After finishing the write, migration engine 1113 deletes the source file from NAS-1 2000 through NFS server 2111 or HSM API 2112, and notifies the stub management program through HSM API 2112 of the deletion of the source file.

Step 807: Stub management program 2114 generates a stub file 2134 for the migrated file, and stops blocking of any WRITE operations directed to the migrated file.

Access Following Migration and Stub Generation

Figure 9A:
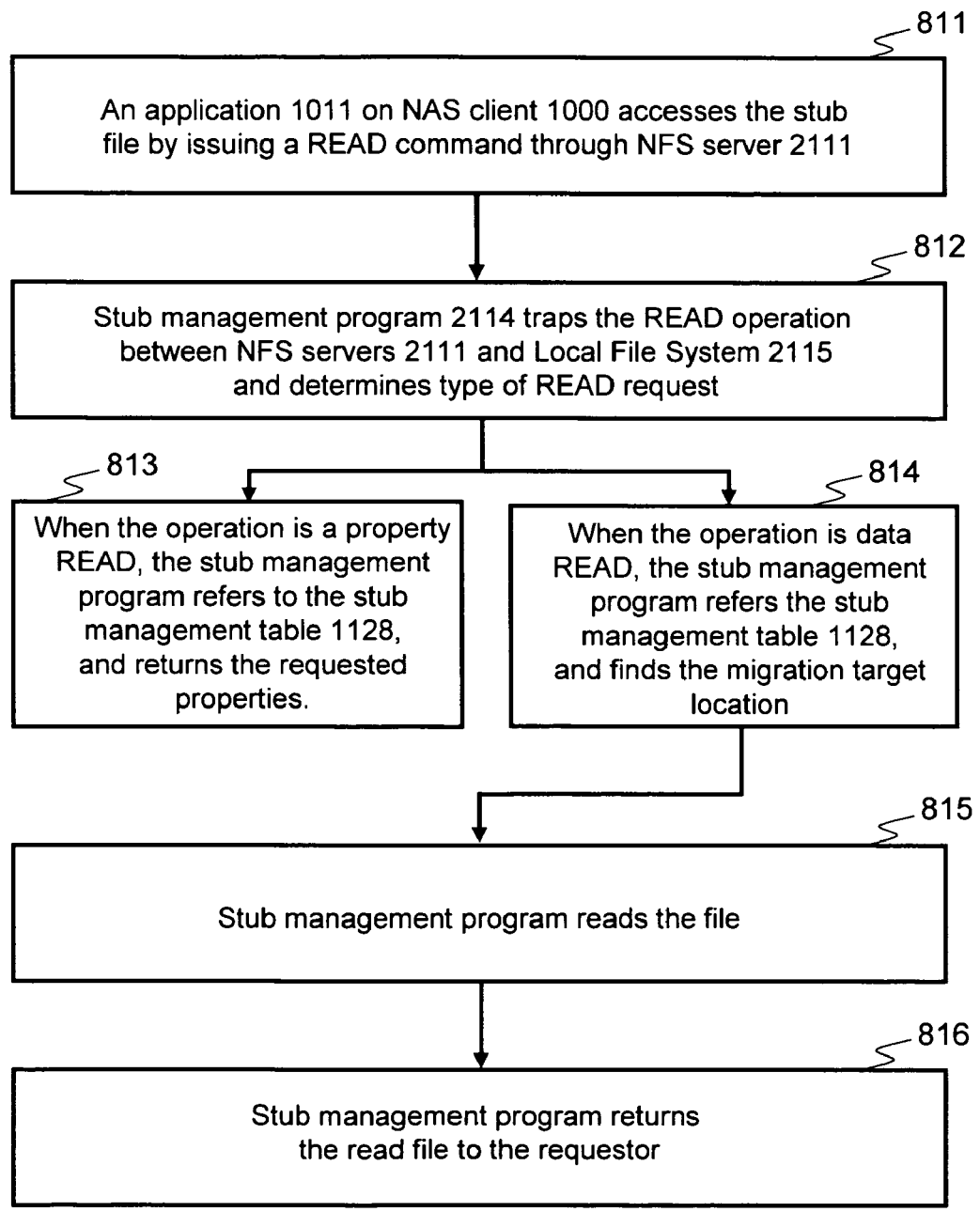
FIGS. 9A-9B illustrate an exemplary process and for I/O access following file migration and stub generation.

FIG. 9A illustrates an exemplary procedure of stub access carried out when an I/O operation is received that is a READ command.

Step 811: An application 1011 on NAS client 1000 accesses the stub file (e.g. /nas1/a.txt) by issuing a READ command through NFS server 2111.

Step 812: Stub management program 2114 traps the operations between NFS servers 2111 and Local File System 2115 by referring to stub management table 1128 to determine whether the operation is directed to a migrated file.

Step 813: When the operation is a property READ (i.e., a READ request directed to the obtaining the properties or attributes of the file contained in the Inode information 2542 in stub management table 1128), the stub management program refers to the stub management table 1128, returns the requested properties, and the process ends. Alternatively, if the stub file includes just file name and a pointer to the second tier, and does not include all property information, the process goes on to the Step 814.

Step 814: When the operation is a data READ, the stub management program refers to the stub management table 1128, and finds the migration target location.

Step 815: The stub management program 2114 sends a request to the migration engine 1113 to read the file. Alternatively, if the stub management program 2114 has the capability to read the file by itself, instead of requesting that the file be read by using the migration engine, the stub management program reads the file directly from lower tier storage 3000.

Step 816: The stub management program returns the file read to the requester.

In some implementations, it might be preferable to migrate the file back to the original tier to be read, and the stub can be deleted, such as in the case where the file will be accessed often. However, when the lower tier of storage is a CAS, migration back and stub deletion do not happen, since once the file is stored in CAS, the file should not be changed or updated, whereas if the file is moved back to NAS, then there are no mechanisms in place to prevent the file from being updated. The steps for migrating a file back are discussed below with respect to FIGS. 10A-10B.

Figure 9B:
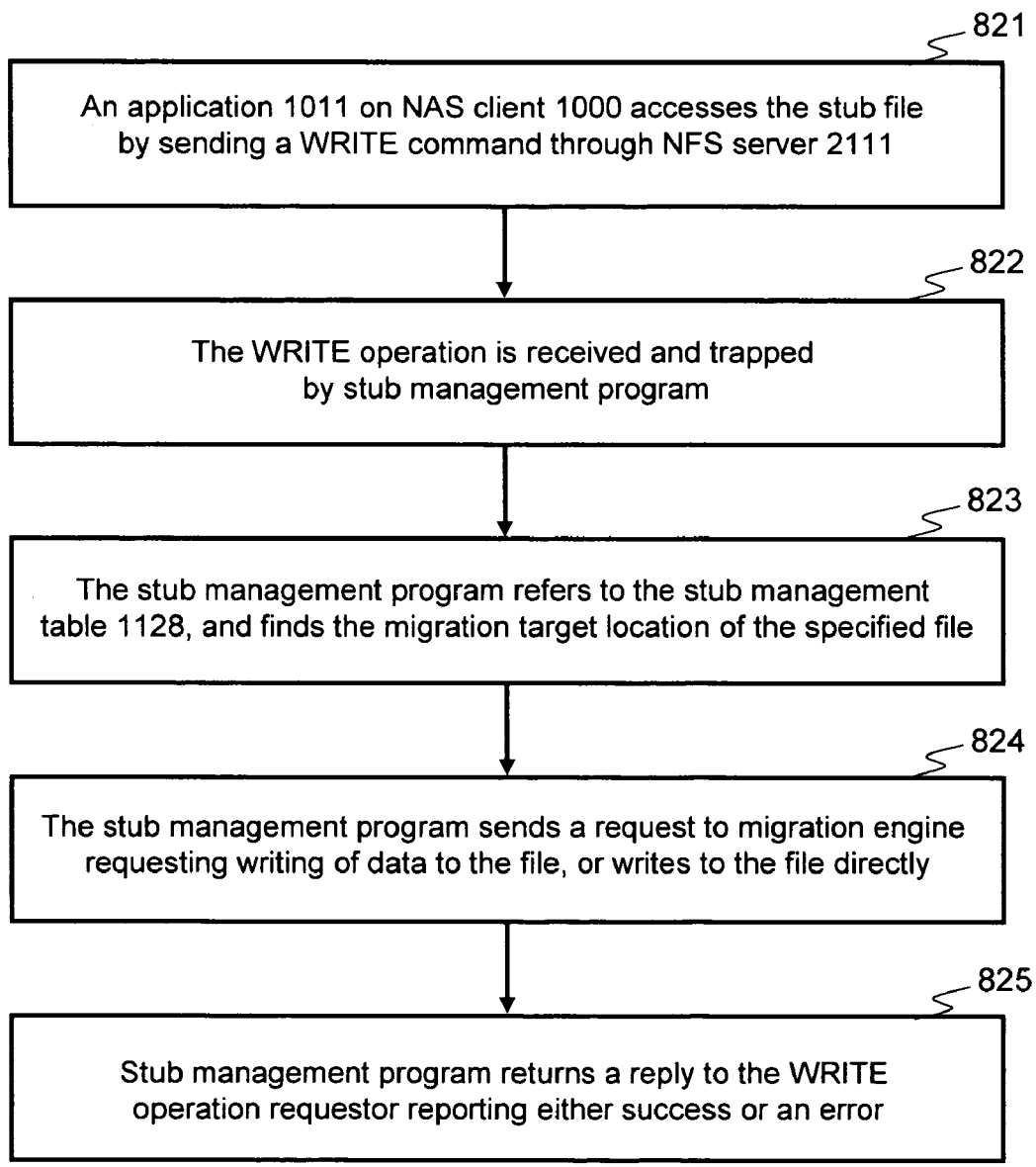

FIG. 9B illustrates the steps carried out when an I/O operation is received that is a WRITE command directed to writing to or updating the migrated file.

Step 821: An application 1011 on NAS client 1000 accesses the stub file by sending a WRITE command through NFS server 2111.

Step 822: The WRITE operation is received and trapped by stub management program 2114.

Step 823: The stub management program 2114 refers to the stub management table 1128, and finds the migration target location 2543 of the specified file.

Step 824: The stub management program 2114 sends a request to migration engine 1113 requesting writing of data to the file. If the stub management program 2114 has the capability to write to the file by itself, instead of requesting that the writing be carried out by migration engine 1113, then the stub management program 2114 writes to the specified file in the lower tier storage 3000. If the migration target is a CAS, the write operation will be denied.

Step 825: The stub management program returns a reply to the WRITE operation request reporting either success or an error. If the migration target is CAS, and the write operation was denied, then an error is returned.

Figure 10A:
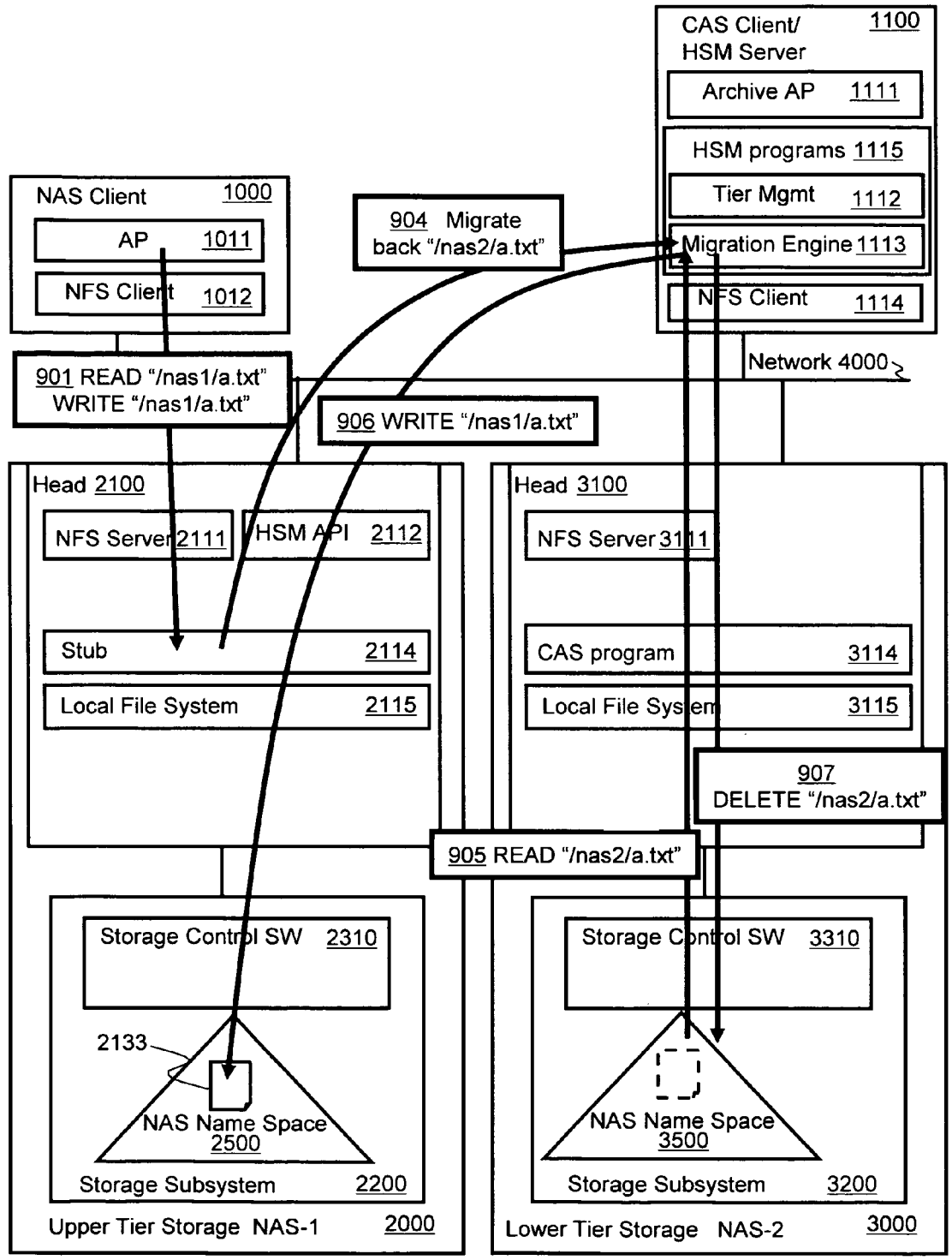
FIGS. 10A-10B illustrates an exemplary process of the migration of a file back to the upper tier.
Figure 10B:
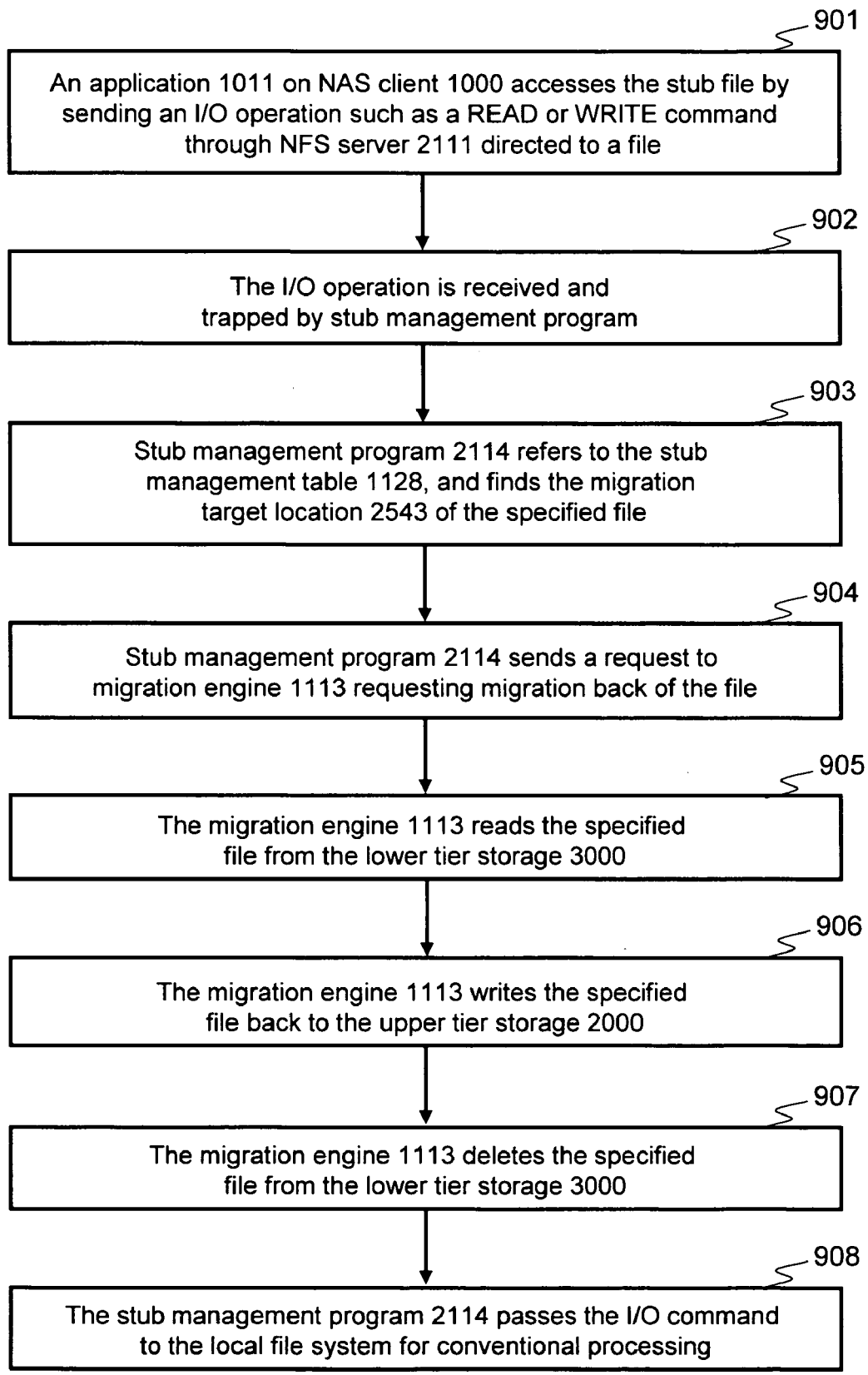

As discussed above, in some implementations, the file can be migrated back to the original tier, and the stub can be deleted. For example, in some embodiments, the stub management program may be configured to automatically migrate back a file to the upper storage tier 2000 for a specified period of time when the file is accessed by an I/O command. However, when the second tier is a CAS, the migration back and stub deletion are generally not permitted. FIG. 10A represents a conceptual diagram of the migration back, while FIG. 10B illustrates a flowchart of an exemplary process for migrating a file back to the upper tier storage and deleting the corresponding stub file.

Step 901: An application 1011 on NAS client 1000 accesses the stub file by sending an I/O operation such as a READ or WRITE command through NFS server 2111 directed to a file, such as "/nas1a.txt".

Step 902: The I/O operation is received and trapped by stub management program 2114.

Step 903: The stub management program 2114 refers to the stub management table 1128, and finds the migration target location 2543 of the specified file.

Step 904: The stub management program 2114 sends a request to migration engine 1113 requesting migration back of the file "/nas2/a.txt".

Step 905: The migration engine 1113 reads the specified file from the lower tier storage 3000.

Step 906: The migration engine 1113 writes the specified file back to the upper tier storage 2000.

Step 907: The migration engine 1113 deletes the specified file from the lower tier storage 3000.

Step 908: The stub management program 2114 passes the I/O command to the local file system for conventional processing.

HSM with Remote Replication

Remote replication for the HSM system will now be described. Remote replication is used mainly for Disaster Recovery, but other applications will also be apparent to those of skill in the art. Thus, the invention is not limited to Disaster Recovery. Under a typical disaster recovery scenario, when the primary storage site is down due to failure, or the like, the secondary storage site can take over the operations of the first site.

Figure 11:
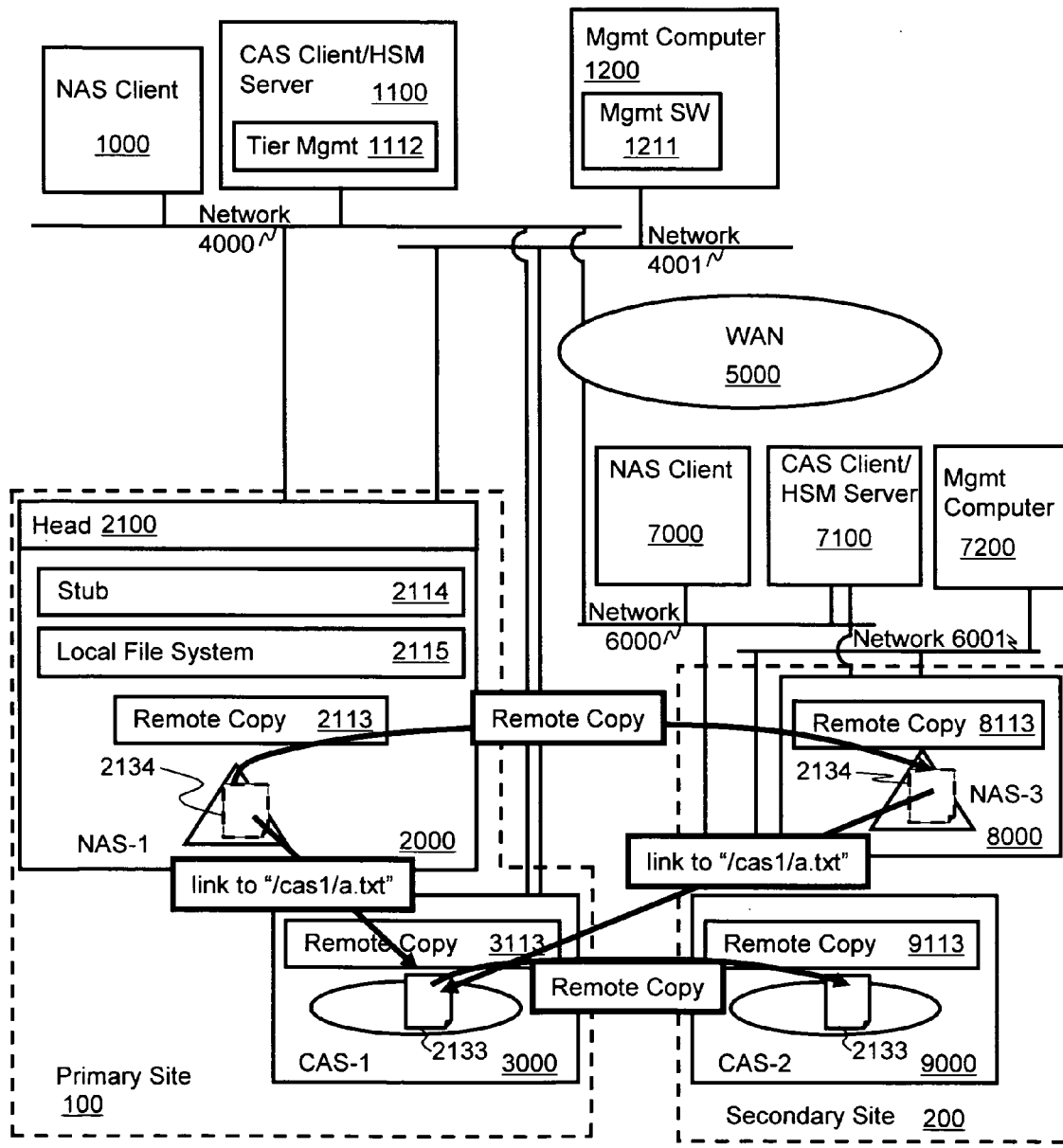
FIG. 11 illustrates an exemplary conceptual diagram of remote replication for the HSM system in the prior art.

FIG. 11 represents a conceptual diagram of remote replication carried out in a HSM system. In FIG. 11 both NAS and CAS remote replication features may be employed. The remote replication mechanisms 2113, 3113, 8113, 9113 can be located in the heads or storage subsystems of the respective storages, and an administrator can initially set up the remote replications. When the remote replication feature of the storage system is block based, the feature is implemented under the stub management program layer, as illustrated in FIG. 11. Under a typical remote copy configuration, following an initial copy of all files on upper tier storage 2000 to upper tier storage 8000, the remote copy program 2113 on the upper tier storage 2000 is configured to automatically copy all updates to any files stored upper tier storage 2000 to upper tier storage 8000 at the secondary site 200. Similarly, following initial copy, remote copy program 3113 on lower tier storage 3000 automatically copies updates to lower tier storage 9000 at secondary site 200.

Thus, remote copy program 2113 on upper tier storage 2000 automatically copies the stub file 2134 from upper tier storage 2000 at the primary storage site 100 to upper tier storage 8000 at the secondary storage site 200 (Step 111) after the stub file 2134 is generated. Similarly, the remote replication program 3113 on lower tier storage 3000 (CAS-1) independently copies the migrated file 2133 to the lower tier storage 9000 (CAS-2) at the secondary site 200 after the migrated file 2133 is migrated to the lower tier storage 3000. Accordingly, in the case in which HSM with stub implementation is used, when the stub file is copied to the secondary site, the copied stub file contains a pointer to the original target location of the migrated file in the primary site (for example, "/cas1/a.txt", as illustrated). Thus, the NAS client at the remote site cannot access the migrated file 2133 at the remote site through the stub file 2134 because the stub file points to a location on the primary site 100, rather than to any location at the secondary site 200. Furthermore, if there is not a complete failure of lower tier storage 3000 (CAS-1) at the primary site 100, the upper tier storage 8000 at the secondary site 200 may in some cases be able to access the migrated file 2133 on CAS-1 3000 using the copied stub file 2134. However, this is not usually a desirable alternative since the NAS client attempting to access the file will suffer a large delay in communications because the secondary site 200 is typically located far away from the primary site 100.

HSM with Remote Copy According to First Exemplary Embodiments of the Invention

In order to address the issues described above, exemplary embodiments of the invention automatically re-establish target location information according to the tier configuration at the remote secondary site 200. Additionally, exemplary embodiments of the invention create a stub file at upper tier storage at the secondary site 200, and/or move the migrated file from upper tier storage to lower tier storage at the secondary site 200. Further, if the copied data already exists at lower tier storage 9000, then migration is not required.

Figure 12:
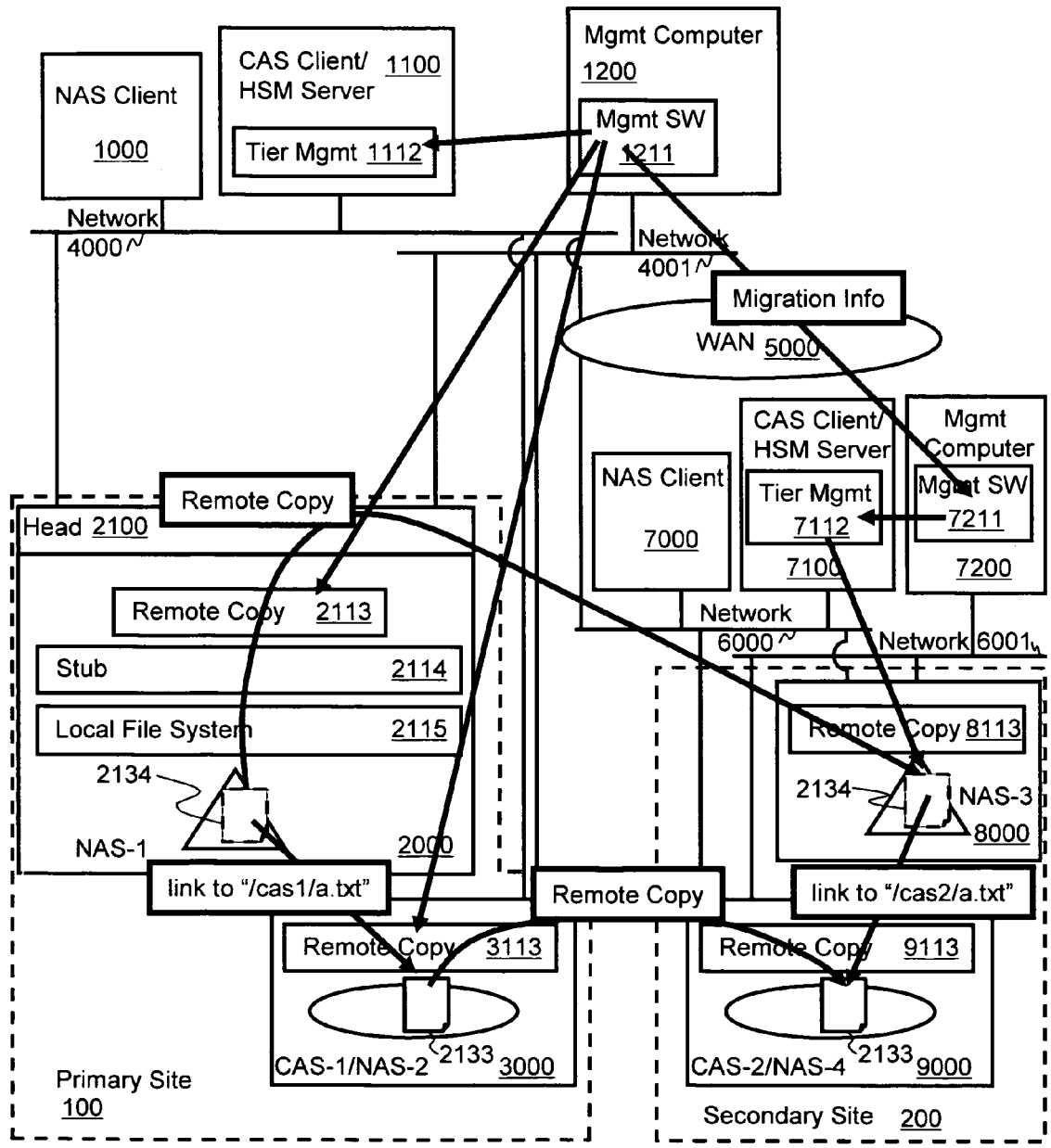
FIG. 12 illustrates an exemplary conceptual diagram of remote replication for the HSM system according to exemplary first embodiments of the invention.
Figure 13:
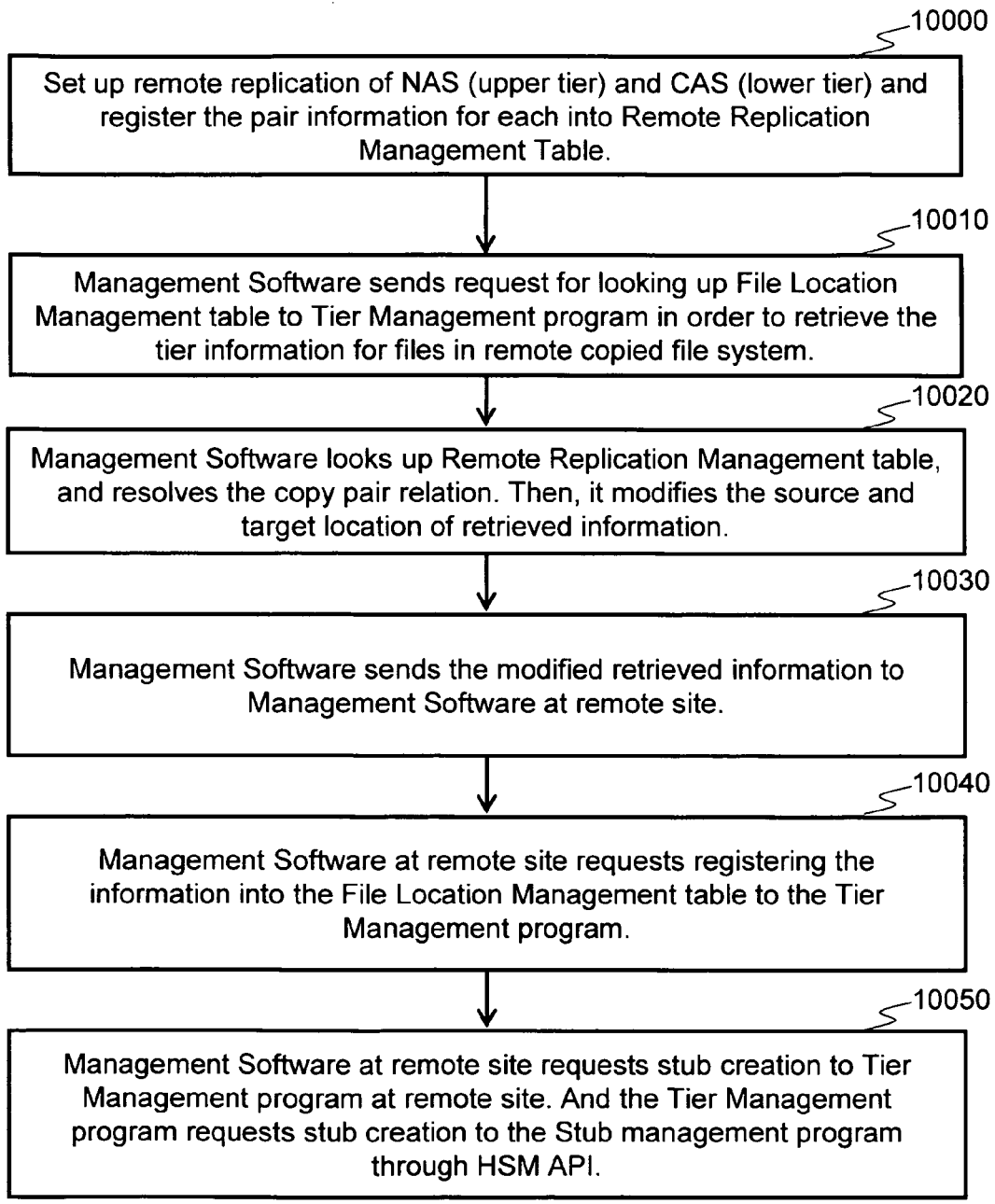
FIG. 13 illustrates an exemplary control flow of remote replication for HSM system according to exemplary first embodiments of the invention.

FIG. 12 represents a conceptual diagram of remote replication for HSM system according to exemplary first embodiments of the invention. FIG. 13 illustrates an exemplary control flow of remote replication for the HSM system according to the exemplary first embodiments of the invention.

Step 10000: An administrator uses Management Software 1211 to set up remote replication of the upper tier storage 2000, which means creating a pair of a source file system on upper tier storage 2000 (NAS-1) and a target file system on upper tier storage 8000 (NAS-3), through. Then, the Management Software 1211 registers the pair information into Remote Replication Management Table 1127. Also, the administrator uses Management Software 1211 to set up remote replication of the lower tier storage 3000 (CAS-1) by first determining the particular file system on the lower tier storage 3000 that is associated with the replicated file system on the upper tier storage 2000, and then creating a replication pair between the particular file system on the lower tier storage 3000 and a file system on the lower tier storage 9000 at the secondary site 200. Then, the Management Software 1211 registers the pair information into Remote Replication Management Table 1127. Alternatively, instead of having an administrator perform these operations, the Management Software 1211 can refer to File Location Management Table 1126 or Tier Management program 1112 in order to find the particular associated file system, and then setup the lower tier storage remote replication automatically.

Step 10010: An administrator uses Management Software 1211 to refer to Primary Site File Location Management Table 1126 directly or through Tier Management program 1112. The Primary Site File Location Management Table 1126 (FIG. 4A) is used to retrieve the original tier information for the files that have been copied to the remote file systems at the secondary site 200. Alternatively, instead of using Management Software 1211 for retrieval of the retrieved file information from Primary Site File Location Management Table 1126, a management interface of HSM programs 1115 at HSM server computer 1100 may be used for this step.

Step 10020: The Management Software 1211 looks up Remote Replication Management table 1127, and resolves the copy pair relations by determining which file systems form replication pairs. Then, Management Software 1211 modifies the file name 2521 and target location 2523 of the retrieved file information. For example, "/nas1/a.txt" in Primary Site File Location Management Table 1126 is modified to "/nas3/a.txt" by referring to the Remote Replication Management Table 1127, in which entry 2537 shows the relationship. Similarly, "/cas1/a.txt" in Primary Site File Location Management Table 1126 is modified to "/cas2/a.txt" by referring to the Remote Replication Management Table 1127, in which entry 2538 shows the relationship. In the case in which management interface of HSM program is used, the Tier Management program 1112 sends a request for retrieval of remote replication pair information to Management Software 1211, which provides the remote replication pair information of Remote Replication Management Table 1127.

Step 10030: The modified retrieved file information is sent to the Management Software 7211 at remote secondary site 200 by the Management Software 1211 at primary site 100 for incorporation into Secondary Site File Location Management Table 7126. Alternatively, the above modification of the file name and target location of the retrieved file information can be carried out by Management Software 7211 at remote secondary site 200 following receipt of the retrieved information. Further, in the case in which the management interface of HSM programs 1115 is used, the Tier Management program 1112 may send the modified retrieved file information to the Tier Management program 7112 at remote secondary site 200.

Step 10040: The Management Software 7211 at remote secondary site 200 sends a request to the Tier Management program 7112 for incorporating the received modified file information into the Secondary Site File Location Management table 7126 at the secondary site 200. In the case that management interface of HSM program is used, the Tier Management program 7112 may incorporate the modified retrieved information into Secondary Site File Location Management Table 7126.

Step 10050: The Management Software 7211 at remote secondary site 200 requests stub creation to Tier Management program 7112 at remote site. The Tier Management program 7112 at remote site sends a request for stub creation to the stub management program on NAS-3 8000 through HSM API on computer 7100. As described, the management software and HSM programs can co-exist on the same physical server.

Thus, according to the foregoing steps, as illustrated in FIG. 12, the stub file 2134 in NAS-1 2000 is copied by remote copy program 2113 to NAS-3 8000. Also, migrated file 2133 in CAS-1/NAS-2 3000 is copied by remote copy program 3113 to CAS-2/NAS-4 9000. Management software 1211 on management computer 1200 and/or tier management software 1112 on HSM server computer 1100 retrieves file information on remote copies and the tier hierarchy, and sends modified file information to management software 7211 on management computer 7200 at the secondary site. Management software 7211 and/or tier management software 7112 on HSM server computer 7100 incorporates the retrieved file information into the Secondary Site File Location Management Table 7126, and uses the modified information to modify the copy of stub file 2134 stored on NAS-3 8000 to link to the location of the copy of the migrated file 2133 which was remote copied to CAS-2/NAS4 9000, so that accesses to the copy of stub file 2134 on NAS-3 will access the copy of the migrated file on 2133 on CAS-2/NAS4 9000. For example, if there is a failure of primary site 100, such as due to a disaster, NAS client 1000 may continue to access the data of migrated file 2133 by accessing the copy of migrated file 2133 on CAS-2/NAS4 9000, which is accomplished by accessing the copy of stub file 2134 on NAS-3 at the secondary site 200. Furthermore, as is often the case during a failure at the primary site, the NAS client 1000 at the primary site 100 may also be inoperative due to the failure. In such a case, failover software is executed so that the NAS client 7000 at the secondary site takes over the job of NAS client 1000. In this case, applications running on NAS client 7000 will also be able to access the data of migrated file 2133 by accessing the copy of migrated file 2133 on CAS-2/NAS-4 9000, which is also accomplished by accessing the copy of stub file 2134 on NAS-3 at the secondary site 200.

Managing Differences in Timing of Remote Copy

The timing at which remote copy is carried out may differ between the upper tier storages 2000, 8000 and the lower tier storages 3000, 9000. This means that the completion of remote copy of for the upper tier storages 2000, 8000 might be not synchronized with the remote copy completion of the lower tier storages with respect to the same file. For example, NAS-1 2000 might complete remote copy of stub file 2134 to NAS-3 8000 substantially sooner than CAS-1 3000 completes remote copy of migrated file 2133 to CAS-2 9000. If the upper tier storage completes remote copy earlier than the lower tier storage, and the target location information is modified as discussed above with respect to FIGS. 12 and 13, then there is no correct target file at the lower tier storage 9000 at the secondary site 200. To address this issue, the target location information modification (i.e., steps 10040 and 10050 of FIG. 13) should be delayed until the associated lower tier remote copy is completed.

Figure 14:
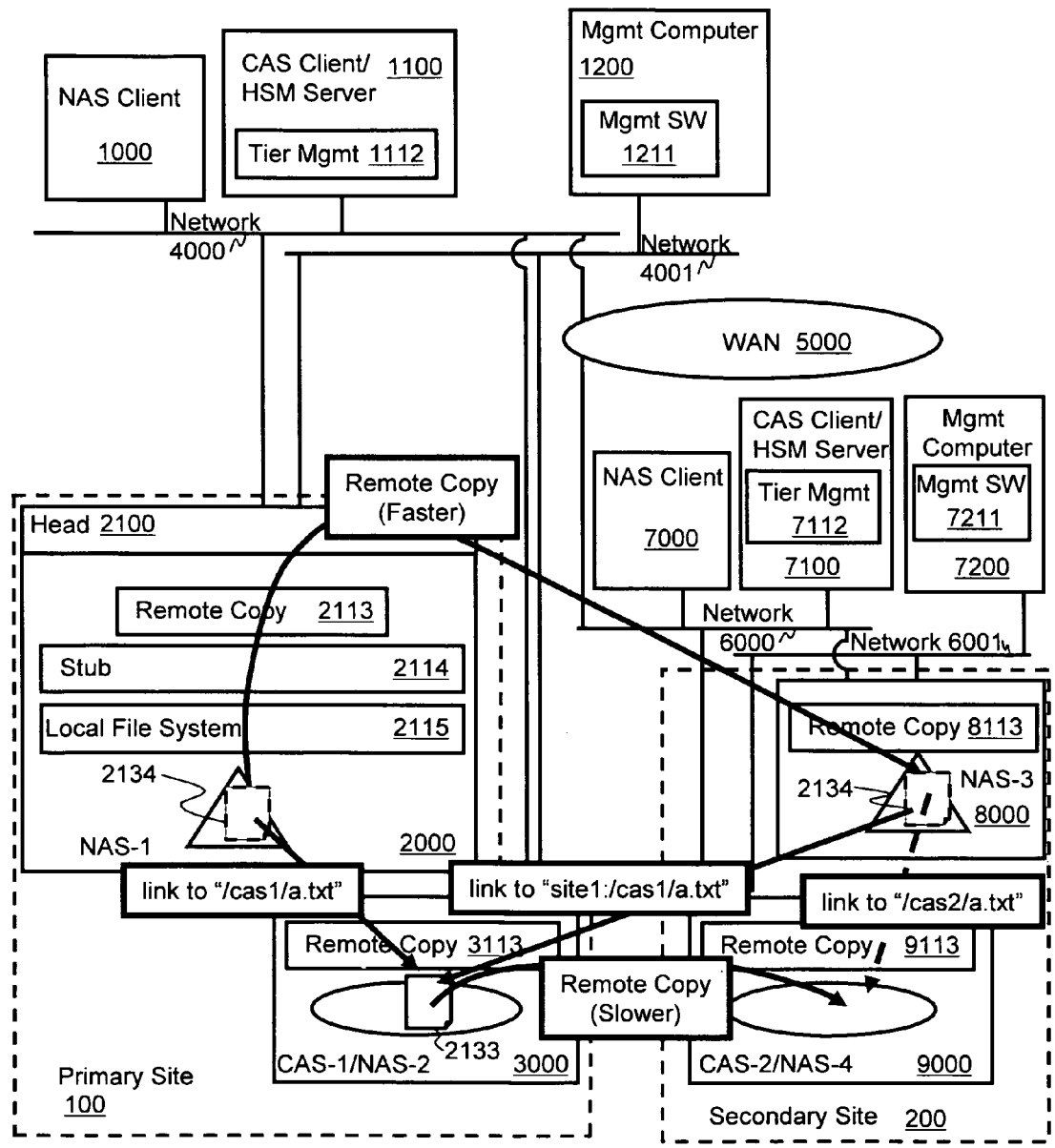
FIG. 14 illustrates an exemplary conceptual diagram of remote replication for the HSM system according to exemplary second embodiments of the invention.
Figure 15:
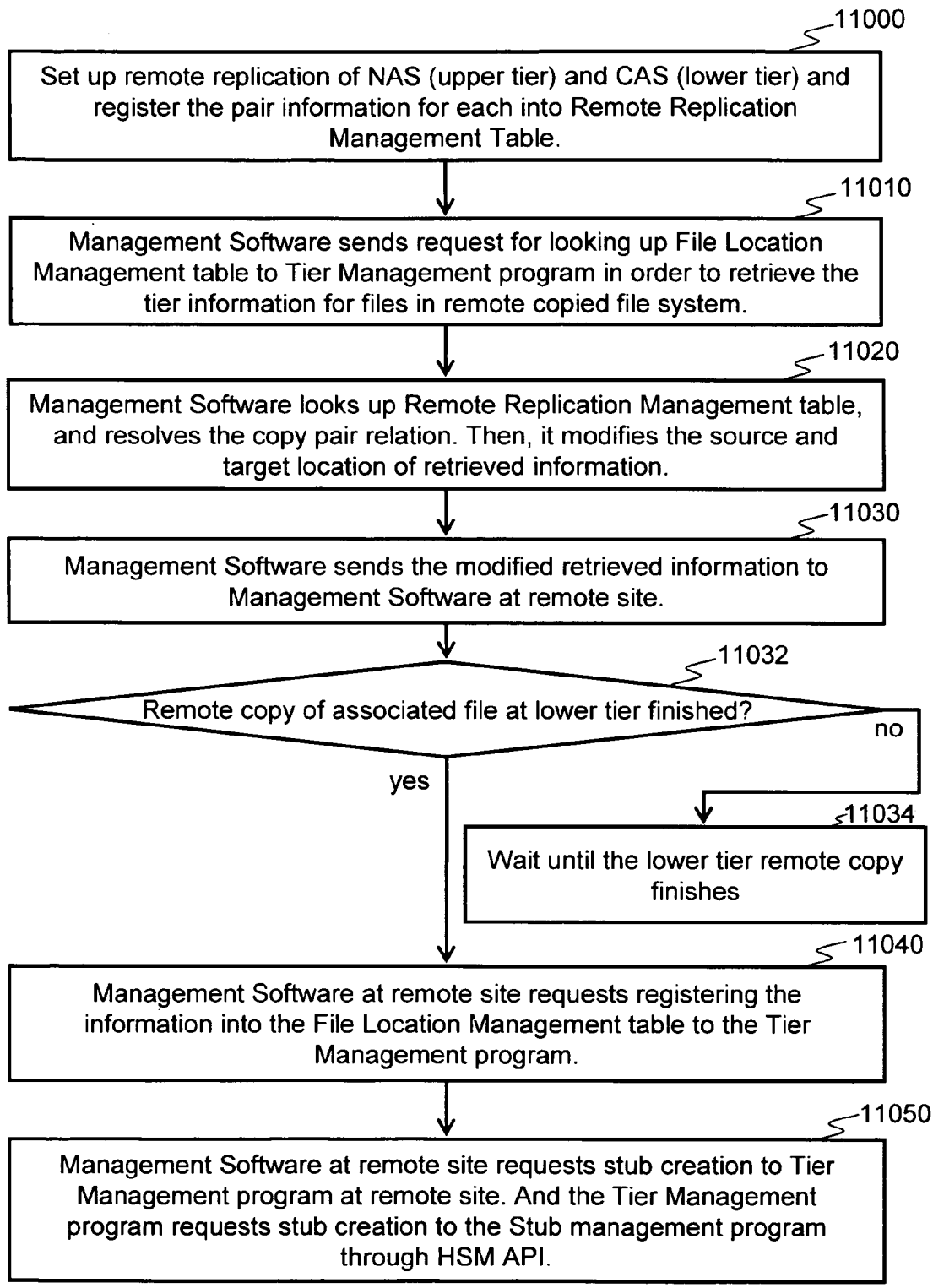
FIG. 15 illustrates an exemplary control flow of remote replication for HSM system according to exemplary second embodiments of the invention.

FIG. 14 represents a conceptual diagram of exemplary second embodiments of remote replication in a HSM system taking into account relative timings at which remote copies are carried out in the different tiers. FIG. 15 illustrates an example of control flow of exemplary second embodiments of remote replication in a HSM system taking into account relative timings at which remote copies are carried out in the different tiers.

Steps 11000-11030 are the same as Steps 10000-10030 described above with reference to FIG. 13, and do not need to be described again here.

Step 11032: The Management Software at remote secondary site 200 checks the progress of the remote copy of the corresponding migrated file 2133 between the lower tiers of storage 3000 and 9000. When the remote copy has already finished, the process goes to the next step.

Step 11034: On the other hand, when the remote copy has not finished yet, the process waits until the lower tier remote copy has finished. During the wait period, the stub file 2134 copied to the upper tier storage 8000 retains original target location information, and any client accesses should go to the CAS at primary site. Thus, although accesses to the original target location suffer from communication delays, the client is able to keep accessing the file in this manner until remote copy of the migrated file 2133 is completed. Furthermore, in this case, modification of the file information for incorporation into the Secondary Site File Location Management Table 7126 is preferably carried out at the secondary site 200, rather than at the primary site 100. In order for Management Software 7211 to determine the completion of the lower tier remote copy, the Management Software 7211 can poll the status of the remote copy process, assuming that the remote copy program in the lower tier is able to maintain remote copy status for each file. Alternatively, remote copy program in the lower tier can be configured to notify management software 7211 upon the completion of the remote copy of each file. Moreover, the above process can be included as an option for the first embodiments of the invention. Thus, if an administrator decides not to activate the option, the Management Software 7211 may be configured to automatically request that stub program on upper-level storage 8000 at the secondary site 200 block file access through HSM API until the lower-level tier finishes remote copy. In the situation in which the remote replication of the lower-level tier finishes earlier than the upper-level tier, there will not be the same problem, because the migrated file in the lower-level tier will be access to the stub file in the upper-level tier at the primary site 100 until the stub file is copied to the secondary site 200.

Steps 11040-11050 are the same as Steps 10040-10050 described above with reference to FIG. 13, and do not need to be described again here.

Server-Based Remote Replication

Figure 16:
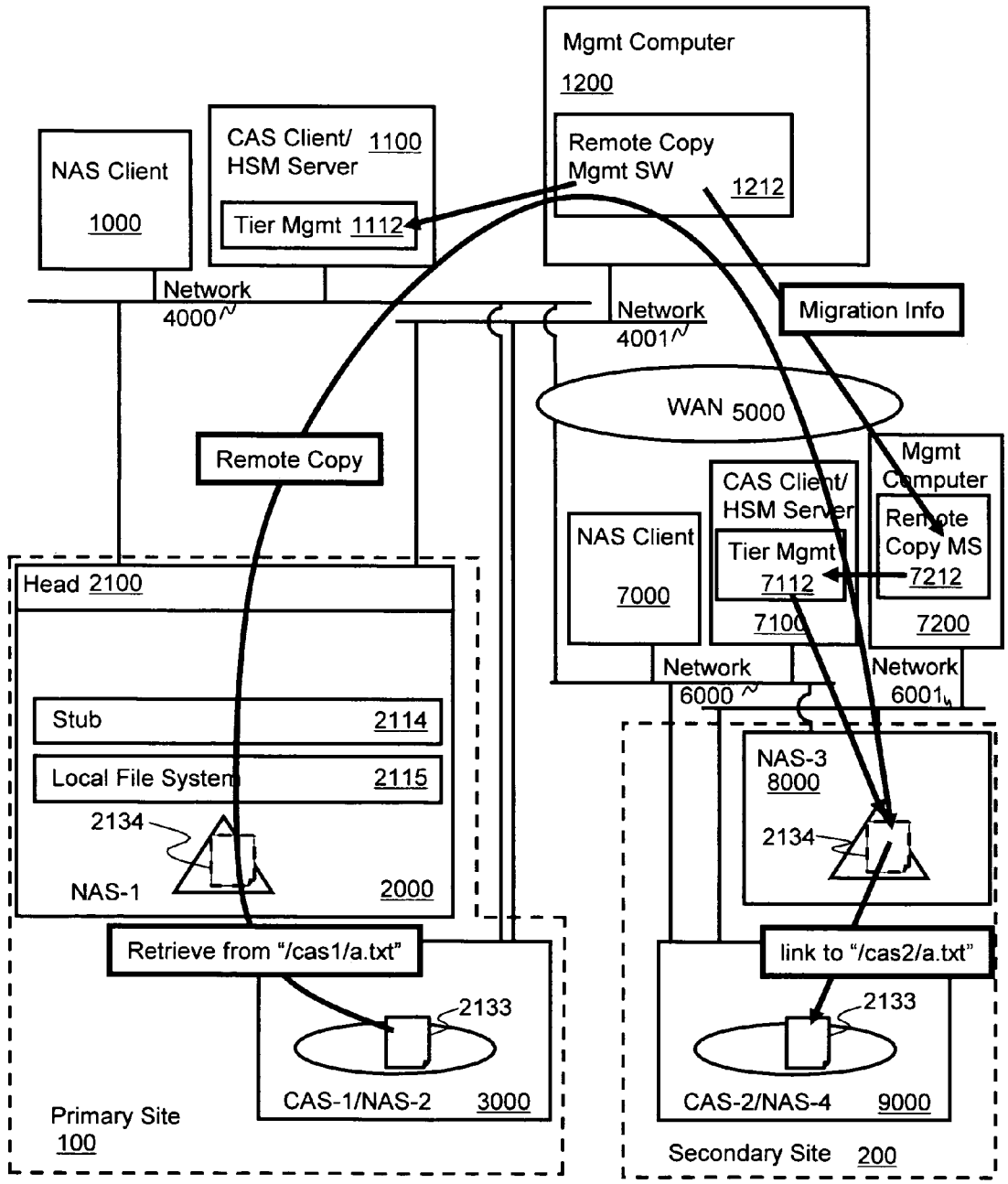
FIG. 16 illustrates an exemplary conceptual diagram of remote replication for HSM system according to exemplary third embodiments of the invention.

In the situation in which remote copy management software 1212 resides at Management Computer 1200, as illustrated in FIG. 16, or at HSM Server 1100, then server-based remote replication technology is employed. When carrying out server based remote replication, the primary file system is first mounted, and then the remote copy management software 1212 is able to access the mounted file system through Network File System access. In this case, the remote replication software 1212 is not able to recognize stub files 2134 on the upper-level tier file system, and just writes the migrated file 2133 on the upper-level tier 8000 at secondary site 200.

Figure 17:
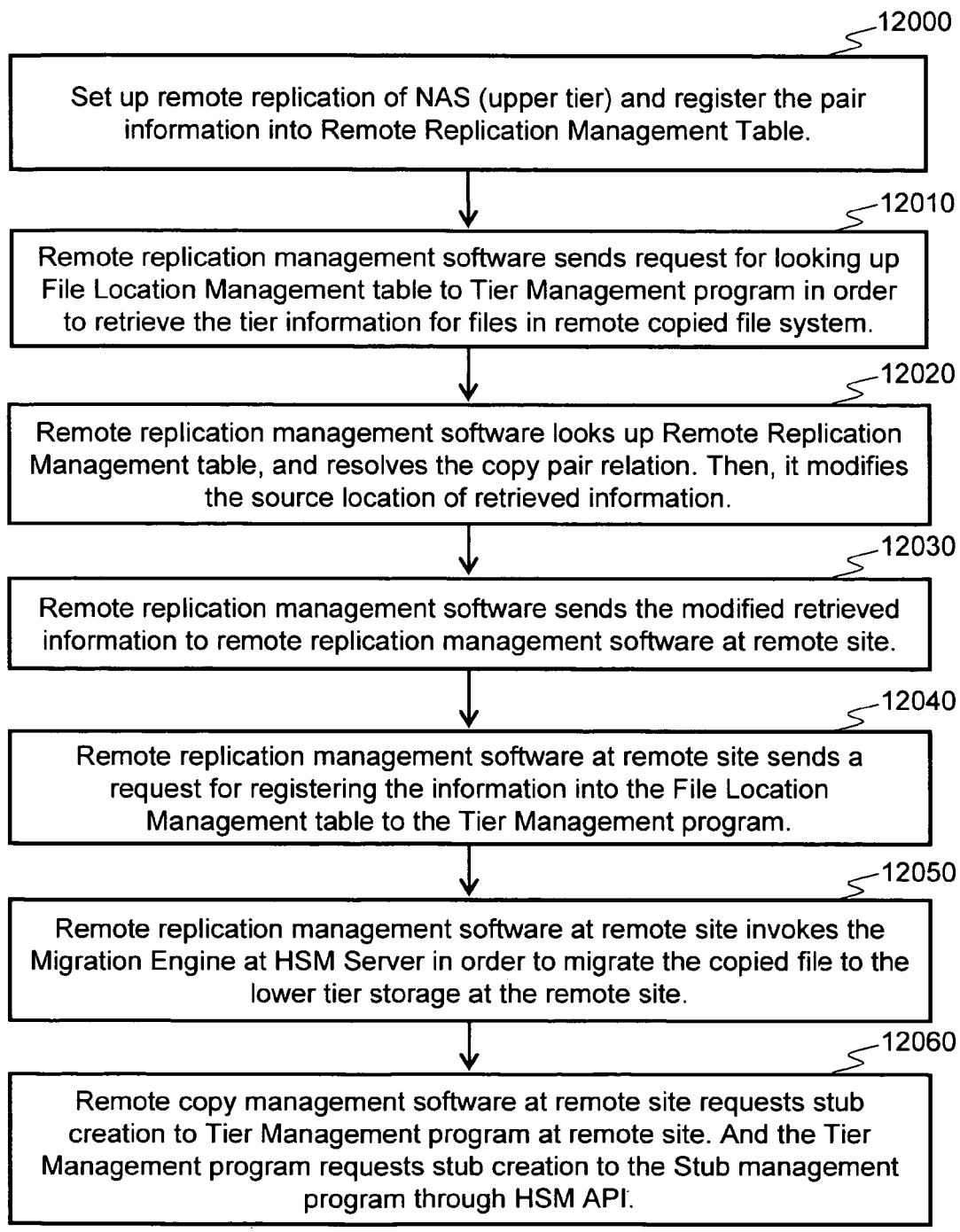
FIG. 17 illustrates an exemplary control flow of remote replication for HSM system according to exemplary third embodiments of the invention.

To solve this problem, the migrated file 2133 which is stored in the lower-level tier 3000 should be migrated to the lower-level tier 9000 at secondary site 200. FIG. 16 represents a conceptual diagram of exemplary third embodiments of remote replication in a HSM system. FIG. 17 illustrates an example of a control flow of exemplary third embodiments of remote replication in a HSM system.

Step 12000: An administrator uses remote copy management software 1212 on Management Computer 1200 or HSM Server 1100 to set up remote replication of upper-level storage tier 2000 to upper-level storage tier 8000. This entails creating a pair of a source file system on upper storage tier 2000 and a target file system on upper storage tier 8000. Then, the remote copy management software 1212 registers the pair information into Remote Replication Management Table 1127.

Step 12010: An administrator sends a request for looking up primary site file location management table 1126 to Tier Management program through the remote copy management software 1212. The tier information for files in the remote copied file system can be retrieved from the primary site file location management table 1126. Alternatively, instead of using remote copy management software 1212, a management interface of the HSM programs 1115 at HSM server 1100 computer can be used for this function.

Step 12020: The remote copy management software 1212 looks up remote replication management table 1127, and determines the copy pair relation for the file system identified in step 12010. Then, remote copy management software 1212 modifies the File Name 2521 of the retrieved information, as discussed above with respect to step 10020 of FIG. 13. Unlike the earlier embodiments described above, the target location 2523 cannot be modified in this embodiment because the file system in the lower-level tier does not have a remote copy implementation, i.e., no remote copy takes place between the lower-level tier storages 3000 and 9000. Additionally, in the situation in which the management interface of the HSM programs 1115 is used, the Tier Management program 1112 sends a request to remote copy management software 1212 for retrieving the remote replication pair information.

Step 12030: The modified retrieved information is sent to the remote copy management software 7212 at secondary site 200 by the remote copy management software 1212. The modification of the retrieved information can be carried out by remote copy management software 7212 at upper-level tier storage 8000 at secondary site 200, instead of being carried out by remote copy management software 1212 at primary site 100. Additionally, in the case in which the management interface of HSM programs 1115 is used, the Tier Management program 1112 sends the modified retrieved information to the Tier Management program 7112 at secondary site 200.

Step 12040: The remote copy management software 7212 at secondary site 200 requests registering the information into the File Location Management table to the Tier Management program 7112. In the case that management interface of HSM program is used, the Tier Management program registers modified retrieved information.

Step 12050: The remote copy management software 7212 at secondary site 200 invokes the migration engine at HSM Server 7100 in order to migrate the copied file which was stub in the first tier. The administrator has already registered the tier information in the tier management table 7125.

Step 12060: The remote copy management software 7212 at secondary site 200 sends a request for stub creation to the Tier Management program 7112 at remote site. The Tier Management program 7112 at remote site requests stub creation to the stub management program through HSM API.

Figure 18:
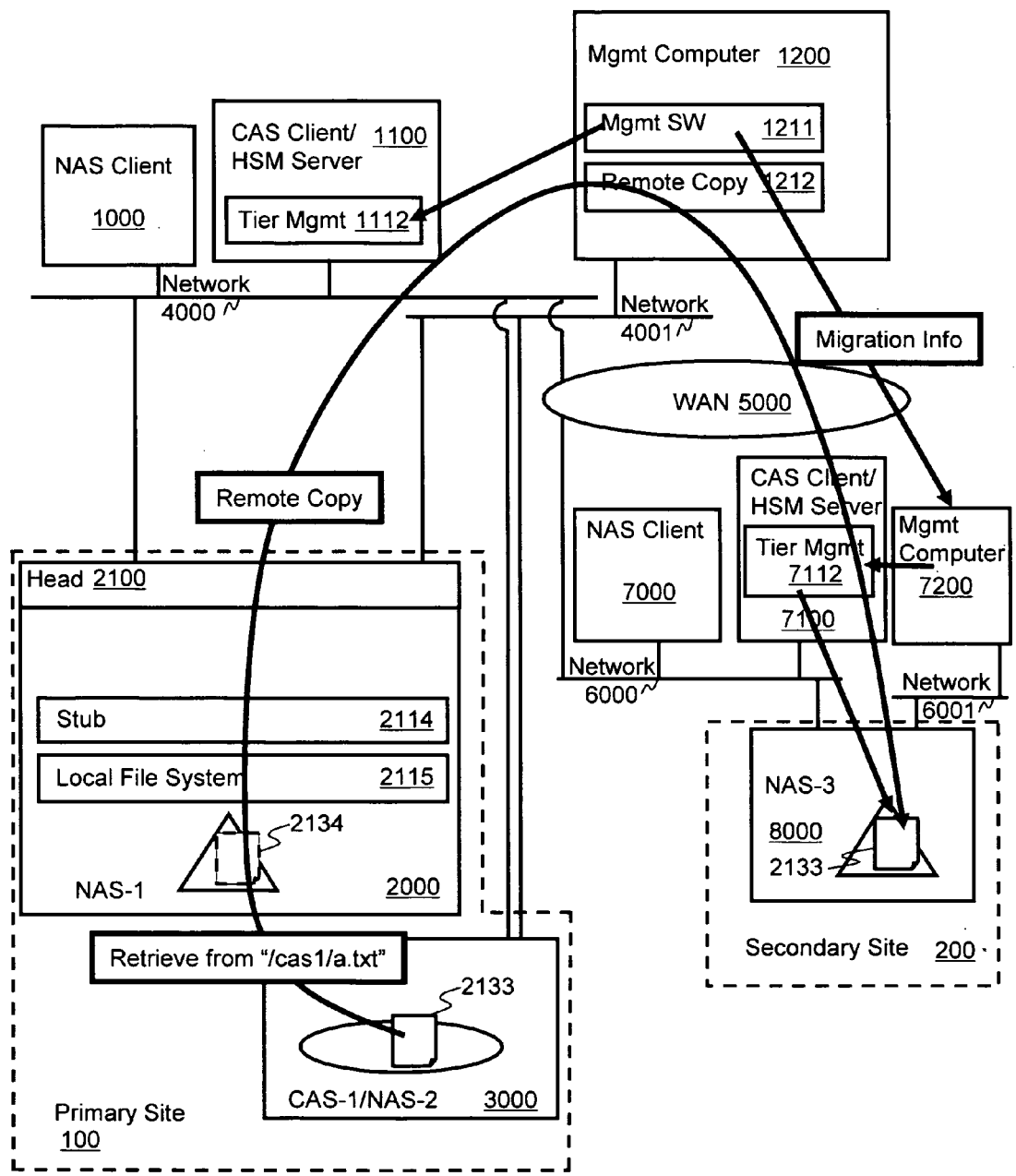
FIG. 18 illustrates an exemplary conceptual diagram of remote replication for the HSM system according to exemplary fourth embodiments of the invention.

FIG. 18 illustrates the case in which there is no lower level storage tier at secondary site 200. In this configuration, steps 12000 through 12030 are carried out the same as described above with respect to FIGS. 16-17. However, at step 12040, when Tier Management program checks if there is tier information for the migrated file and finds that there is no lower storage tier, the process is completed, and steps 12050-12060 are not required. Accordingly, this embodiment enables remote copy protection of a HSM system using a single NAS system (NAS-3) at the secondary site 200.

From the foregoing it may be seen that exemplary embodiments of the invention provide a method and apparatus for remote replication in a HSM system. To keep correct link information, exemplary embodiments of the invention provide for re-establishing target location information according to the tier configuration at the remote secondary site. In order to maintain proper tier configuration, exemplary embodiments of the invention provide a method to create a stub at an upper level tier at the secondary site, and/or move a file from the upper level tier to a lower level tier.

Of course, the system configurations illustrated in FIGS. 1-2, 7, 8, 10-12, 14, 16 and 18 are purely exemplary of information systems in which the present invention may be implemented, and the invention is not limited to a particular hardware or logical configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for incorporating remote replication in tiered storage systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An information system comprising:
    a first storage site having a first storage system in communication with a second storage system, the first storage system providing an upper tier of storage having first storage characteristics and the second storage system providing a lower tier of storage having second storage characteristics;
    a second storage site remote from the first storage site having a third storage system configured to receive remote replication from the first storage system and having a fourth storage system configured to receive remote replication from the second storage system,
    wherein, when a first file on the first storage system is migrated to the second storage system, a second file is created on the first storage system and stored in place of the first file indicating a storage location of the first file on the second storage system, and
    wherein, when a copy of the second file is replicated from the first storage system to the third storage system and a copy of the first file is replicated from the second storage system to the fourth storage system via remote replication, information is transmitted to the second storage site for linking the copy of the second file at the third storage system to the copy of the first file at the fourth storage system;
    a first remote copy module located on the first storage system for carrying out the remote replication from the first storage system to the third storage system; and
    a second remote copy module located on the second storage system for carrying out the remote replication from the second storage system to the fourth storage system,
    wherein the second remote copy module checks completion of the replication of the copy of the first file to the fourth storage system, when the replication of the copy of the first file to the fourth storage system is not complete, linking of the copy of the second file at the third storage system to the copy of the first file at the fourth storage system is delayed, and an original target location information is retained, when the replication of the copy of the first file to the fourth storage system is completed, the linking of the copy of the second file at the third storage system to the copy of the first file at the fourth storage system is carried out.

2. The information system according to claim 1,
    wherein the first storage system and the third storage system are network attached storage (NAS) systems implementing a file-based protocol for sending and receiving communications,
    wherein the second storage system and the fourth storage system are contents addressable storage (CAS) systems, and
    wherein the first storage system is configured to migrate the first file automatically to the second storage system when a condition established in a predetermined migration policy is met.

3. The information system according to claim 1,
    wherein the first storage system, the second storage system, the third storage system and the fourth storage system are network attached storage (NAS) systems implementing a file-based protocol for sending and receiving communications.

4. The information system according to claim 1, further comprising:
    a first management computer in communication with the first storage system,
    wherein, when the copy of the second file is replicated to the third storage system, the first management computer is configured to determine a location of the copy of the first file on the fourth storage system from management data and transmit this location of the copy of the first file with the information for linking the copy of the second file with the copy of the first file.

5. The information system according to claim 4, further comprising:
    a second management computer at the second site, the second management computer configured to receive the information transmitted from the first management computer and instruct linking of the copy of the second file with the copy of the first file in accordance with the information received.

6. The information system according to claim 1, further comprising:
    a hierarchical management module containing hierarchical management data including predetermined conditions for file migration,
    wherein, the first file is migrated to the second storage system as a result of a corresponding predetermined condition being met, the hierarchical management server being configured to issue an instruction for migrating the first file from the first storage system to the second storage system when the corresponding predetermined condition is met.

7. The information system according to claim 6, further comprising:
    a migration module, the migration module being configured to receive the instruction for migrating the first file and to carry out migration of the first file from the first storage system to the second storage system.

8. The information system according to claim 7,
    wherein the migration module and hierarchical management module are located on the first storage system.

9. The information system according to claim 7,
    wherein the migration module and hierarchical management module are located on a server computer in communication with the first storage system and the second storage system.

10. A method for carrying out remote replication in a hierarchical storage arrangement, the method comprising:
    providing a first storage system in communication with a second storage system at a first storage site, the first storage system providing an upper tier of storage having first storage characteristics and the second storage system providing a lower tier of storage having second storage characteristics;

configuring a third storage system at a second storage site remote from the first storage site to receive remote replication from the first storage system;

configuring a fourth storage system to receive remote replication from the second storage system at the second storage site;

migrating a first file on the first storage system to the second storage system;

creating a second file on the first storage system as a result of the migration, the second file being stored in place of the first file indicating a storage location of the first file on the second storage system;

replicating a copy of the second file from the first storage system to the third storage system and a copy of the first file from the second storage system to the fourth storage system via remote replication;

transmitting information to the second storage site for linking the copy of the second file at the third storage system to the copy of the first file at the fourth storage system; and checking completion of the replication of the copy of the first file to the fourth storage system, wherein when the replication of the copy of the first file to the fourth storage system is not complete, linking of the copy of the second file at the third storage system to the copy of the first file at the fourth storage system is delayed, and an original target location information is retained, when the replication of the copy of the first file to the fourth storage system is completed, the linking of the copy of the second file at the third storage system to the copy of the first file at the fourth storage system is carried out.

11. The method according to claim 10, further including a step of following failure at the first storage site, continuing operations associated with the first file by accessing the copy of the first file stored at the fourth storage system via the copy of the second file stored in the third storage system.

12. The method according to claim 10, further including a step of providing a management computer at the first storage site, the management computer obtaining the information for linking the copy of the second file at the third storage system to the copy of the first file at the fourth storage system from a hierarchical storage management module at the first storage site and transmitting the information to the second storage site.

13. The method according to claim 10, further including steps of determining, following completion of replication of the copy of the second file to the third storage system, whether replication of the copy of the first file to the fourth storage system is complete; and when the replication of the copy of the first file to the fourth storage system is not complete, delaying linking of the copy of the second file to the copy of the first file is until replication of the copy of the first file to the fourth storage system is completed.

14. A method for carrying out remote replication in a hierarchical storage arrangement, the method comprising:

providing a first storage system in communication with a second storage system at a first storage site, the first storage system providing an upper tier of storage having first storage characteristics and the second storage system providing a lower tier of storage having second storage characteristics;

configuring a third storage system at a second storage site remote from the first storage site to receive remote replication from the first storage system;

migrating a first file on the first storage system to the second storage system;

creating a second file on the first storage system as a result of the migration, the second file being stored in place of the first file indicating a storage location of the first file on the second storage system;

providing a management computer at the first storage site, the management computer having a remote copy module located thereon for carrying out the remote replication from the first storage site to the second storage site;

replicating a copy of the second file from the first storage system to the third storage system via the remote copy module;

configuring a fourth storage system to receive remote replication of the first file from the second storage system at the second storage site; and checking completion of the replication of the copy of the first file to the fourth storage system, wherein when the replication of the copy of the first file to the fourth storage system is not complete, linking of the copy of the second file at the third storage system to the copy of the first file at the fourth storage system is delayed, and an original target location information is retained, when the replication of the copy of the first file to the fourth storage system is completed, the linking of the copy of the second file at the third storage system to the copy of the first file at the fourth storage system is carried out.

15. The method according to claim 14, further including steps of providing network attached storage (NAS) systems implementing a file-based protocol for sending and receiving communications as the first and third storage systems; and providing a NAS system or a contents addressable storage (CAS) system as the second storage system.

16. The method according to claim 14, further including a step of migrating the first file automatically to the second storage system when a condition established in a predetermined migration policy is met.

17. The method according to claim 14, further including the step of transmitting information to the second storage site for migrating the copy of first file to the fourth storage system and creating a third file on the third storage system as a result of the migration, the third file being stored in place of the copy of the first file indicating a storage location of the copy of the first file on the fourth storage system.

18. The method according to claim 17, further including steps of providing network attached storage (NAS) systems implementing a file-based protocol for sending and receiving communications as the first and third storage systems;

providing contents addressable storage (CAS) systems as the second and fourth storage systems.

19. The information system according to claim 1,
wherein completion of the remote replication from the first storage system to the third storage system by the first remote copy module is not synchronized with completion of the remote replication from the second storage system to the fourth storage system by the second remote copy module.

20. The information system according to claim 1,
wherein the remote replication from the second storage system to the fourth storage system is independent of the remote replication from the first storage system to the third storage system.

* * * * *